(12) United States Patent
Wang et al.

(10) Patent No.: US 11,589,338 B2
(45) Date of Patent: Feb. 21, 2023

(54) ENHANCED SIDELINK (SL) CONTROL SIGNALING WITH TIME DIVISION DUPLEXING (TDD)

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Franklin Park, NJ (US); Jing Sun, San Diego, CA (US); Xiaoxia Zhang, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/152,437

(22) Filed: Jan. 19, 2021

(65) Prior Publication Data

US 2022/0232547 A1    Jul. 21, 2022

(51) Int. Cl.
*H04W 72/04* (2009.01)
*H04L 5/14* (2006.01)
*H04W 72/0446* (2023.01)

(52) U.S. Cl.
CPC ........... *H04W 72/0406* (2013.01); *H04L 5/14* (2013.01); *H04W 72/0446* (2013.01)

(58) Field of Classification Search
CPC .. H04W 72/0406; H04W 72/0446; H04L 5/14
See application file for complete search history.

(56) References Cited

U.S. PATENT DOCUMENTS

| 9,999,041 B2* | 6/2018 | Nimbalker | H04W 74/02 |
| 10,912,087 B2* | 2/2021 | Zhang | H04L 5/00 |
| 2016/0338094 A1* | 11/2016 | Faurie | H04W 72/14 |
| 2017/0171690 A1* | 6/2017 | Kim | H04W 4/70 |

(Continued)

FOREIGN PATENT DOCUMENTS

| EP | 3481021 A1 | 5/2019 |
| WO | 2019160788 A1 | 8/2019 |

OTHER PUBLICATIONS

International Search Report and Written Opinion—PCT/US2021/072912—ISA/EPO—dated Apr. 4, 2022.

*Primary Examiner* — Huy D Vu
*Assistant Examiner* — Bailor C Hsu
(74) *Attorney, Agent, or Firm* — Patterson & Sheridan, LLP

(57) ABSTRACT

Certain aspects of the present disclosure provide techniques for enhanced sidelink (SL) control signaling with time division duplexing (TDD). A method that may be performed by a first user equipment (UE) may include receiving a TDD configuration indicating resources of a resource pool available for SL transmissions between the first UE and at least a second UE and exchanging SL communications with the second UE in one or more slots or symbols based, at least in part, on the TDD configuration. The TDD configuration may define one or more of the slots or symbols as flexible slots or symbols that may be configured as downlink (DL) or uplink (UL) slots or symbols. The TDD configuration may also identify one or more of the slots or symbols as UL slots or symbols and one or more slots or symbols as DL slots or symbols.

27 Claims, 16 Drawing Sheets

(56) References Cited

U.S. PATENT DOCUMENTS

| | | | |
|---|---|---|---|
| 2017/0188391 A1 | 6/2017 | Rajagopal et al. | |
| 2018/0213588 A1* | 7/2018 | Wei | H04W 48/08 |
| 2019/0109891 A1* | 4/2019 | Paruchuri | H04L 9/40 |
| 2019/0173612 A1 | 6/2019 | Kimura et al. | |
| 2020/0053524 A1* | 2/2020 | Novlan | H04W 72/0453 |
| 2020/0068609 A1* | 2/2020 | Wang | H04W 72/0446 |
| 2020/0146044 A1* | 5/2020 | Maaref | H04W 72/14 |
| 2020/0236667 A1* | 7/2020 | Kwak | H04W 4/40 |
| 2020/0280981 A1* | 9/2020 | Shin | H04L 5/0092 |
| 2020/0288435 A1* | 9/2020 | Kwak | H04L 1/1896 |
| 2020/0313805 A1* | 10/2020 | Park | H04L 1/1864 |
| 2020/0314822 A1* | 10/2020 | Lee | H04L 5/0053 |
| 2020/0322977 A1* | 10/2020 | Yasukawa | H04W 72/1278 |

* cited by examiner

800A

| Reservations Signaled by an SCI in Slot $i$ | | |
|---|---|---|
| Reservation | # Sub-channels | Slot |
| 1 | $z$ | $i$ |
| 2 | $z$ | $i + x: 0 < x \leq 31$ |
| 3 | $z$ | $i + y: x < y \leq 31$ |

ENHANCED SIDELINK (SL) CONTROL SIGNALING WITH TIME DIVISION DUPLEXING (TDD)

BACKGROUND

Field of the Disclosure

Aspects of the present disclosure relate to wireless communications, and more particularly, to techniques for enhanced sidelink (SL) control signaling with time division duplexing (TDD).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved sidelink control information (SCI) transmission.

Certain aspects of the subject matter described in this disclosure can be implemented in an apparatus for wireless communication by a first user equipment (UE). The apparatus generally includes a memory and at least one processor coupled to the memory. The memory and the at least one processor are generally configured to receive a time division duplexed (TDD) configuration indicating resources of a resource pool available for sidelink (SL) transmissions between the first UE and at least a second UE. The memory and the at least one processor are generally configured to exchange SL communications with the second UE in one or more slots or symbols based, at least in part, on the TDD configuration.

Certain aspects of the subject matter described in this disclosure can be implemented in an apparatus for wireless communication by a wireless node. The apparatus generally includes a memory and at least one processor coupled to the memory. The memory and the at least one processor are generally configured to determine a TDD configuration indicating resources of a resource pool available for exchanging SL communications between at least a first UE and a second UE. The memory and the at least one processor are generally configured to signal the TDD configuration to at least the first UE.

Certain aspects of the subject matter described in this disclosure provide a method for wireless communication by a first UE. The method generally includes receiving a TDD configuration indicating resources of a resource pool available for SL transmissions between the first UE and at least a second UE. The method generally includes exchanging SL communications with the second UE in one or more slots or symbols based, at least in part, on the TDD configuration.

Certain aspects of the subject matter described in this disclosure provide a method for wireless communication by wireless node. The method generally includes determining a TDD configuration indicating resources of a resource pool available for exchanging SL communications between at least a first UE and a second UE. The method generally includes signaling the TDD configuration to at least the first UE.

Certain aspects of the subject matter described in this disclosure can be implemented in an apparatus for wireless communication by a first UE. The apparatus generally includes means for receiving a TDD configuration indicating resources of a resource pool available for SL transmissions between the first UE and at least a second UE. The apparatus generally includes means for exchanging SL communications with the second UE in one or more slots or symbols based, at least in part, on the TDD configuration.

Certain aspects of the subject matter described in this disclosure can be implemented in an apparatus for wireless communication by a wireless node. The apparatus generally includes means for determining a TDD configuration indicating resources of a resource pool available for exchanging SL communications between at least a first UE and a second UE. The apparatus generally includes means for signaling the TDD configuration to at least the first UE.

Certain aspects of the subject matter described in this disclosure can be implemented in a computer-readable medium having computer executable code stored thereon. The computer readable medium having computer executable code stored thereon generally includes code for receiving a TDD configuration indicating resources of a resource pool available for SL transmissions between the first UE and at least a second UE. The computer readable medium having computer executable code stored thereon generally includes code for exchanging SL communications with the second UE in one or more slots or symbols based, at least in part, on the TDD configuration.

Certain aspects of the subject matter described in this disclosure can be implemented in a computer-readable medium having computer executable code stored thereon. The computer readable medium having computer executable code stored thereon generally includes code for determining a TDD configuration indicating resources of a resource pool available for exchanging SL communications between at least a first UE and a second UE. The computer readable medium having computer executable code stored thereon generally includes code for signaling the TDD configuration to at least the first UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
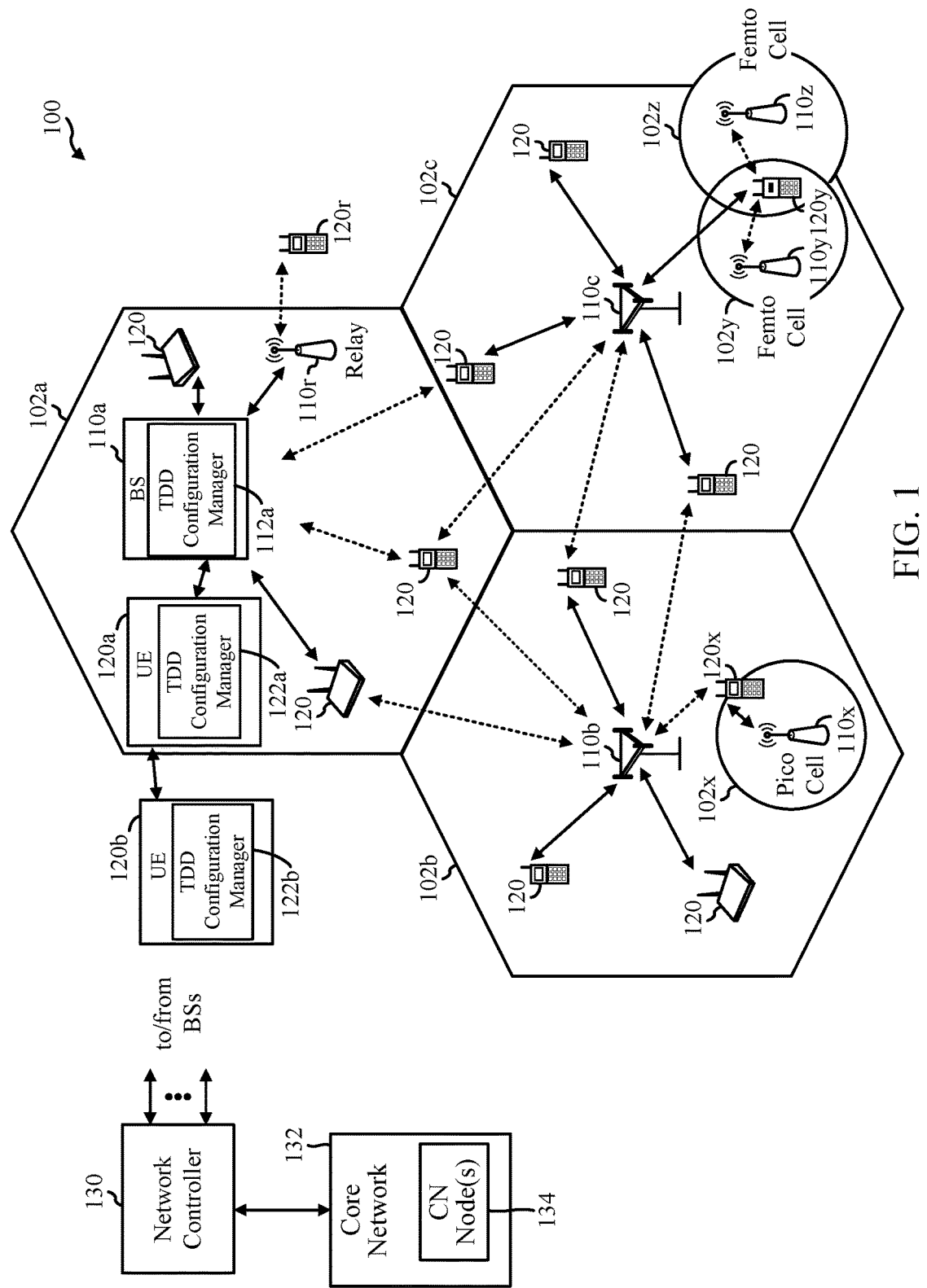
FIG. 1 is a block diagram conceptually illustrating an example telecommunications system, in accordance with certain aspects of the present disclosure.

Aspects of the present disclosure provide apparatus, methods, processing systems, and computer readable mediums for enhanced sidelink (SL) control signaling with time division duplexing (TDD).

A TDD configuration may flexibly provide UEs an indication of UEs subject to half-duplex constraints, an indication of resources available for sidelink communications. In some cases, a relatively "coarse" TDD configuration may be signaled (e.g., broadcast from a gNB or PLC), while dynamic signaling (e.g., via a slot format indicator) may provide "finer" availability of flexible slots.

Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems including later technologies.

NR access may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range (FR) designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR may also support beamforming and beam direction may be dynamically configured. Multiple-input multiple-output (MIMO) transmissions with precoding may also be supported. In some examples, MIMO configurations in the downlink (DL) may support up to 8 transmit antennas with multi-layer DL transmissions up to 8 streams and up to 2 streams per user equipment (UE). In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, according to certain aspects, the wireless communication network 100 may include UEs 120 configured for SL communications based on TDD configurations, as proposed herein. As shown in FIG. 1, the UE 120a includes a TDD configuration manager 122a, the UE 120b includes a TDD configuration manager 122b, and the BS 110a includes a TDD configuration manager 112a. The TDD configuration manager 122a and the TDD configuration manager 122b may be configured to perform operations 1100 of FIG. 11, including receiving a TDD configuration and exchanging SL communications based, at least in part, on the TDD configuration, in accordance with aspects of the present disclosure. The TDD configuration manager 112a may be configured to perform operations 1200 of FIG. 12, including determining a TDD configuration and signaling the TDD configuration, in accordance with aspects of the present disclosure.

The wireless communication network 100 may be an NR system (e.g., a 5G NR network). The core network 132 may be in communication with one or more base station (BSs) 110a-z (each also individually referred to herein as BS 110 or collectively as BSs 110) and/or UEs 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul.

Figure 2:
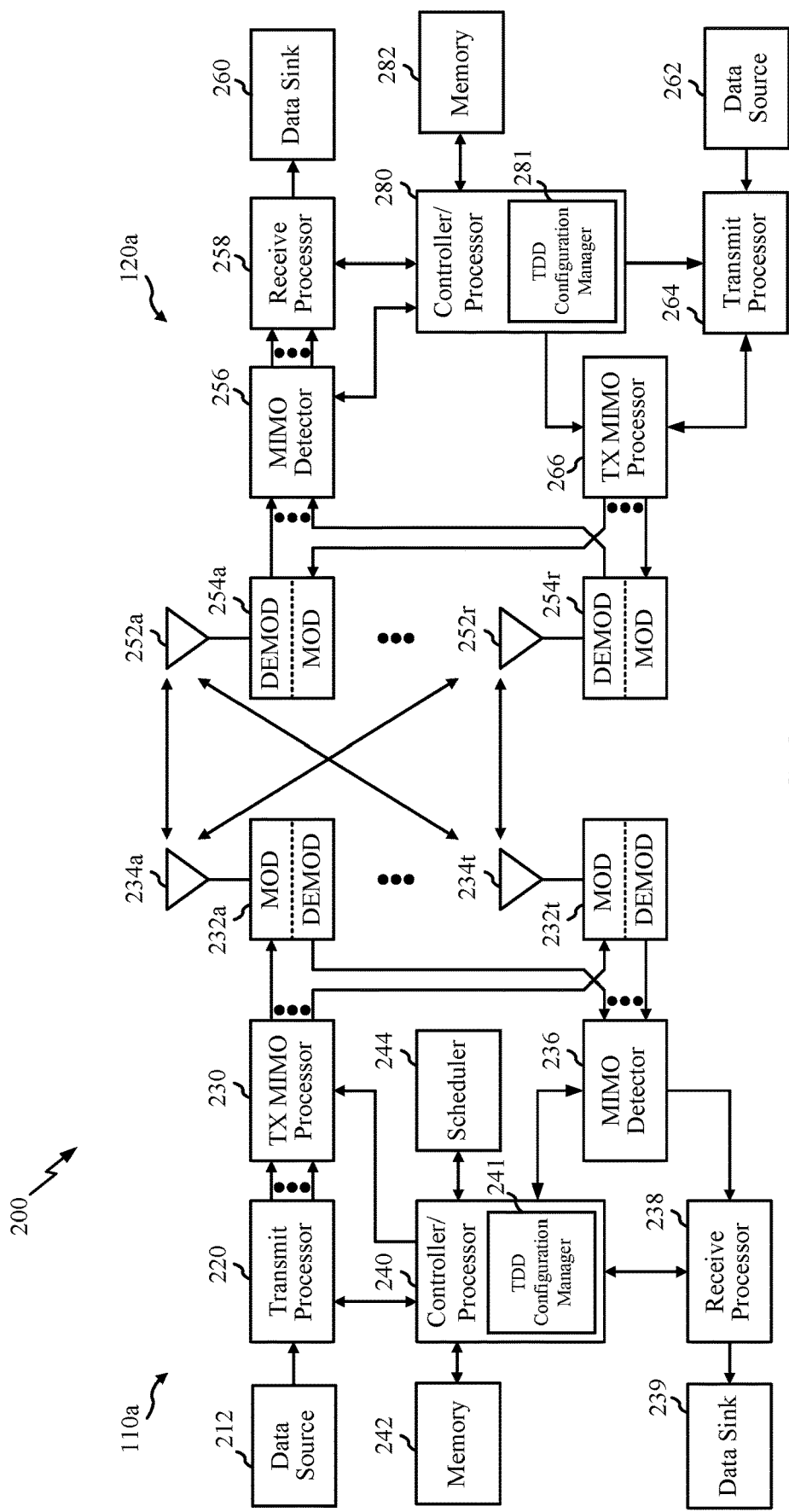
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1, which may be similar components in the UE 120b), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators in transceivers 232a-232t may be transmitted via the antennas 234a-234t, respectively.

At the UE 120a, the antennas 252a-252r may receive the DL signals from the BS 110a, or SL signals from the UE 120b, and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL) and/or SL, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the UL signals from the UE 120a may be received by the antennas 234, processed by the modulators, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238 may be used to perform the various techniques and methods described herein. For example, as shown in FIG. 2, the controller/processor 280 of the UE 120a has a TDD configuration manager 122a and the controller/processor 240 of the BS 110a has a TDD configuration manager 112a. The TDD configuration manager 122a and/or the TDD configuration manager 112a may be configured for determining, signaling, receiving, and/or applying TDD configuration(s) in SL communications.

NR may utilize orthogonal frequency division multiplexing (OFDM) with a cyclic prefix (CP) on the UL and DL. NR may support half-duplex operation using TDD. OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
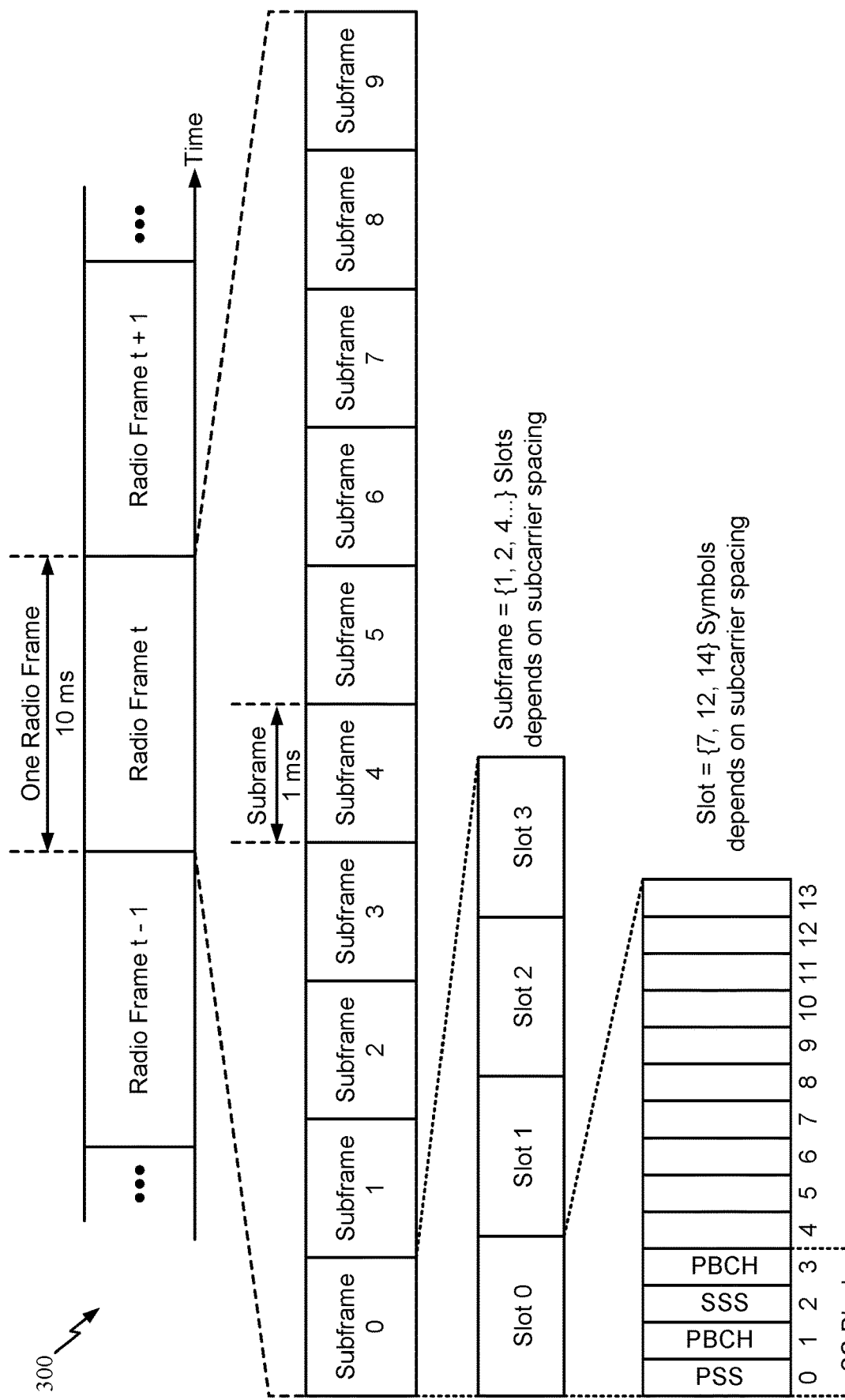
FIG. 3 is an example frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

Example Sidelink (SL) Scenarios

While communication between user equipments (UEs) (e.g., UEs 120 of FIGS. 1 and 2) and base stations (BSs) (e.g., BSs 110 of FIGS. 1 and 2) may be referred to as the access link, and the access link may be provided via a Uu interface, communication between devices may be referred to as the sidelink (SL).

In some circumstances, two or more subordinate entities (e.g., UEs) may communicate with each other using SL signals. Real-world applications of such SL communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications.

Generally, a SL signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the SL signals may be communicated using a licensed spectrum (unlike wireless local area networks (WLANs), which typically use an unlicensed spectrum).

Figure 4A:
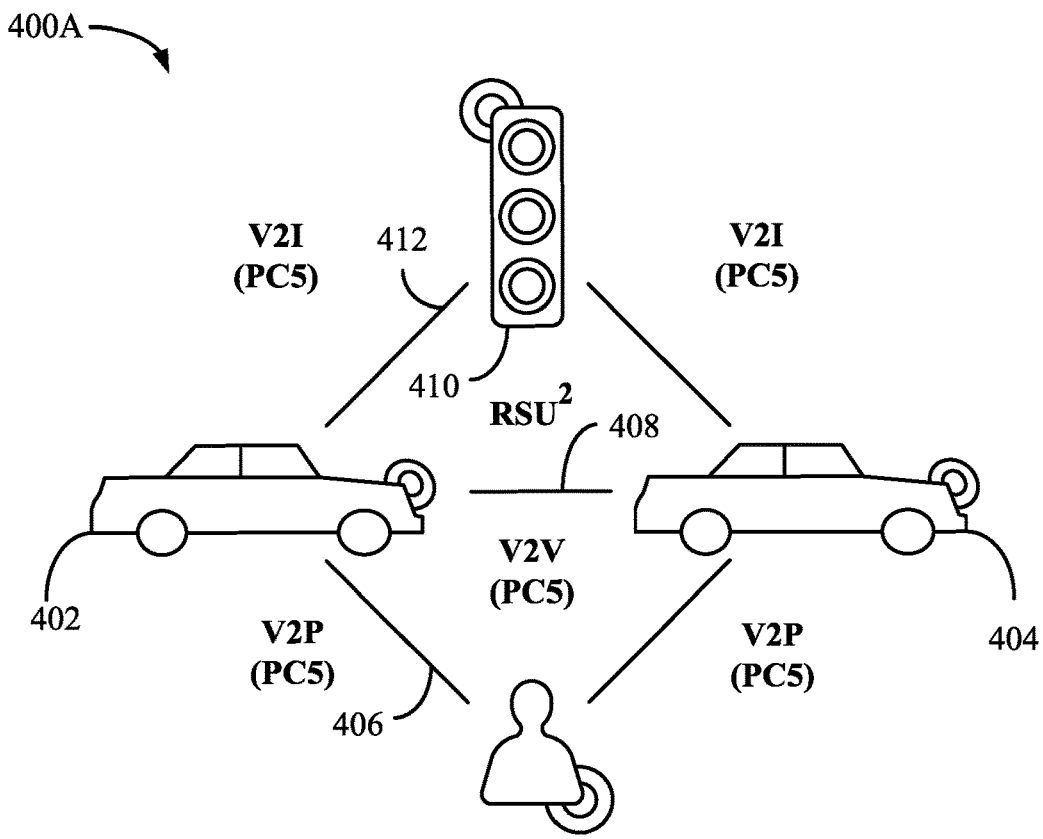
FIGS. 4A and 4B show diagrammatic representations of example vehicle to everything (V2X) systems, in accordance with certain aspects of the present disclosure.
Figure 4B:
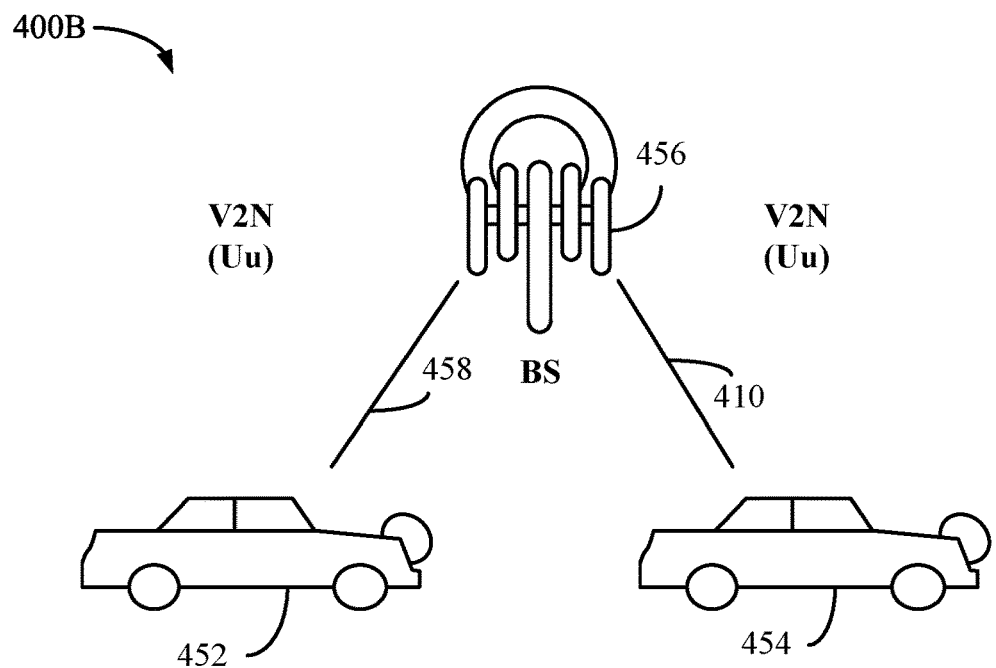

FIGS. 4A and 4B show diagrammatic representations of example vehicle to everything (V2X) systems, in accordance with some aspects of the present disclosure. For example, the vehicles shown in FIGS. 4A and 4B may communicate via SL channels and may perform SL channel state information (CSI) reporting as described herein.

The V2X systems, provided in FIGS. 4A and 4B provide two complementary transmission modes. A first transmission mode, shown by way of example in FIG. 4A, involves direct communications (for example, also referred to as SL communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400A (for example, including vV2V communications) is illustrated with two vehicles 402, 404. The first transmission mode may allow for direct communication between different participants in a given geographic location. As illustrated, a vehicle may have a wireless communication link 406 with an individual (vehicle-to-pedestrian (V2P)) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (vehicle-to-infrastructure (V2I)) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (for example, an eNB or gNB), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data may be obtained from cloud-based sharing services.

As described above, V2V and V2X communications are examples of communications that may be transmitted via a SL. Other applications of SL communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a SL may refer to a direct link between one subordinate entity (for example, UE1) and another subordinate entity (for example, UE2).

Various SL channels may be used for SL communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as SL resource configurations and other parameters used for data transmissions, and the PSSCH may carry the data transmissions.

For the operation regarding PSSCH, a UE may perform either transmission or reception in a slot on a carrier. NR SL may support, for a UE, a case where all the symbols in a slot may be available for SL, as well as another case where only a subset of consecutive symbols in a slot may be available for SL.

PSFCH may carry feedback such as CSI related to a SL channel quality. A sequence-based PSFCH format with one symbol (not including automatic gain control (AGC) training period) may be supported. The following formats may be possible: a PSFCH format based on PUCCH format 2 and a PSFCH format spanning all available symbols for SL in a slot.

Figure 5A:
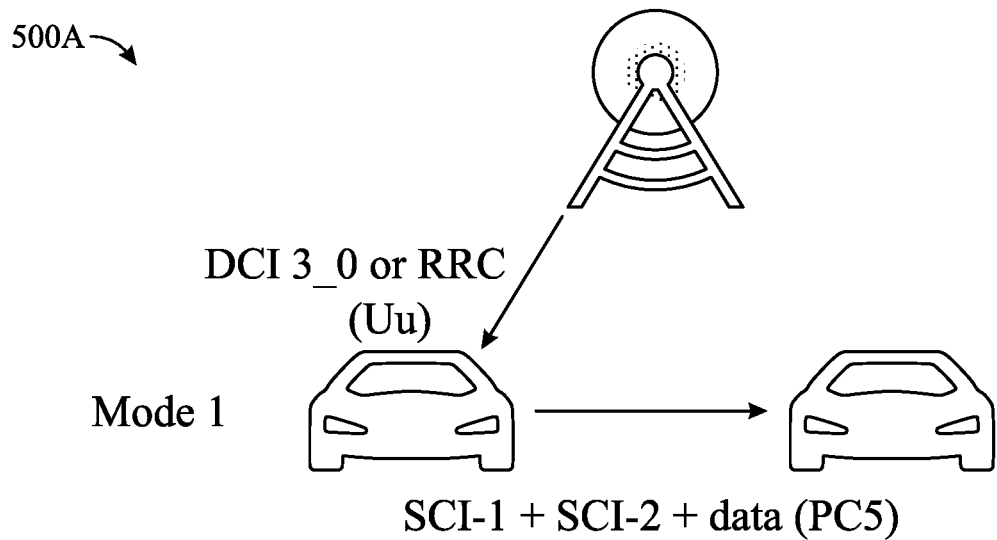
FIGS. 5A and 5B illustrate two modes of sidelink (SL) communications, in accordance with certain aspects of the present disclosure.
Figure 5B:
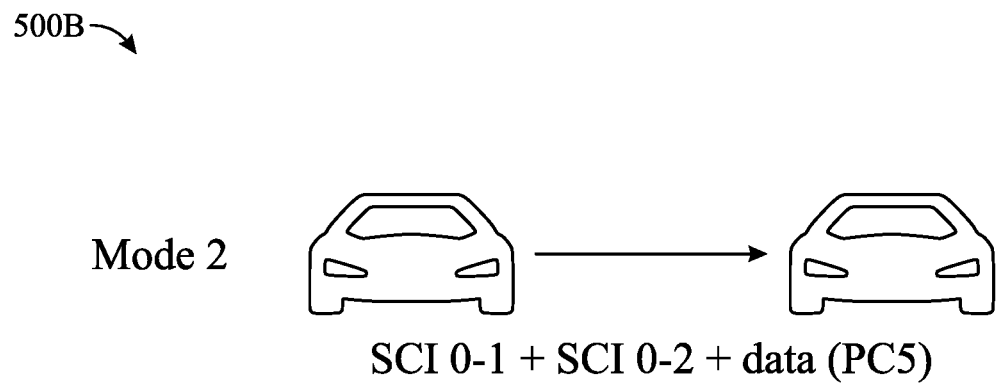

In NR, there are generally two basic SL resource allocation modes. FIGS. 5A and 5B illustrate two modes of SL communication, in accordance with certain aspects of the present disclosure. Receiver (RX) UE behavior may be the same for both SL resource allocation modes.

According to a first mode, Mode 1, as shown in FIG. 5A, a BS may allocate SL resources for SL communication between UEs. For example, a BS may transmit downlink control information (e.g., DCI 3_0) to allocate time and frequency resources and indicate transmission timing. A modulation and coding scheme (MCS) may be determined by a UE within the limit set by the BS.

In some cases, Mode 1 may support dynamic grants (DGs) and configured grants (CGs) (e.g., CG Type 1 and CG Type 2). CG Type 1 may be activated via radio resource control (RRC) signaling from the BS.

According to a second mode, Mode 2, as shown in FIG. 5B, UEs may determine the SL resources (the BS does not schedule SL transmission resources within SL resources configured by BS/network). In this case, UEs may autonomously select SL resources for transmission (following some rules in the NR standard). A UE may assist in SL resource selection for other UEs. A UE may be configured with an NR configured grant for SL transmission, and the UE may schedule SL transmissions for other UEs.

In some cases, a UE may perform channel sensing by blindly decoding all PSCCH channels to determine which resources are reserved for other SL transmissions, by other UEs. In this case, the UE may report the available resources to upper layers so that the upper layers may decide resource usage.

Example Sidelink (SL) Resource Allocation

Figure 6:
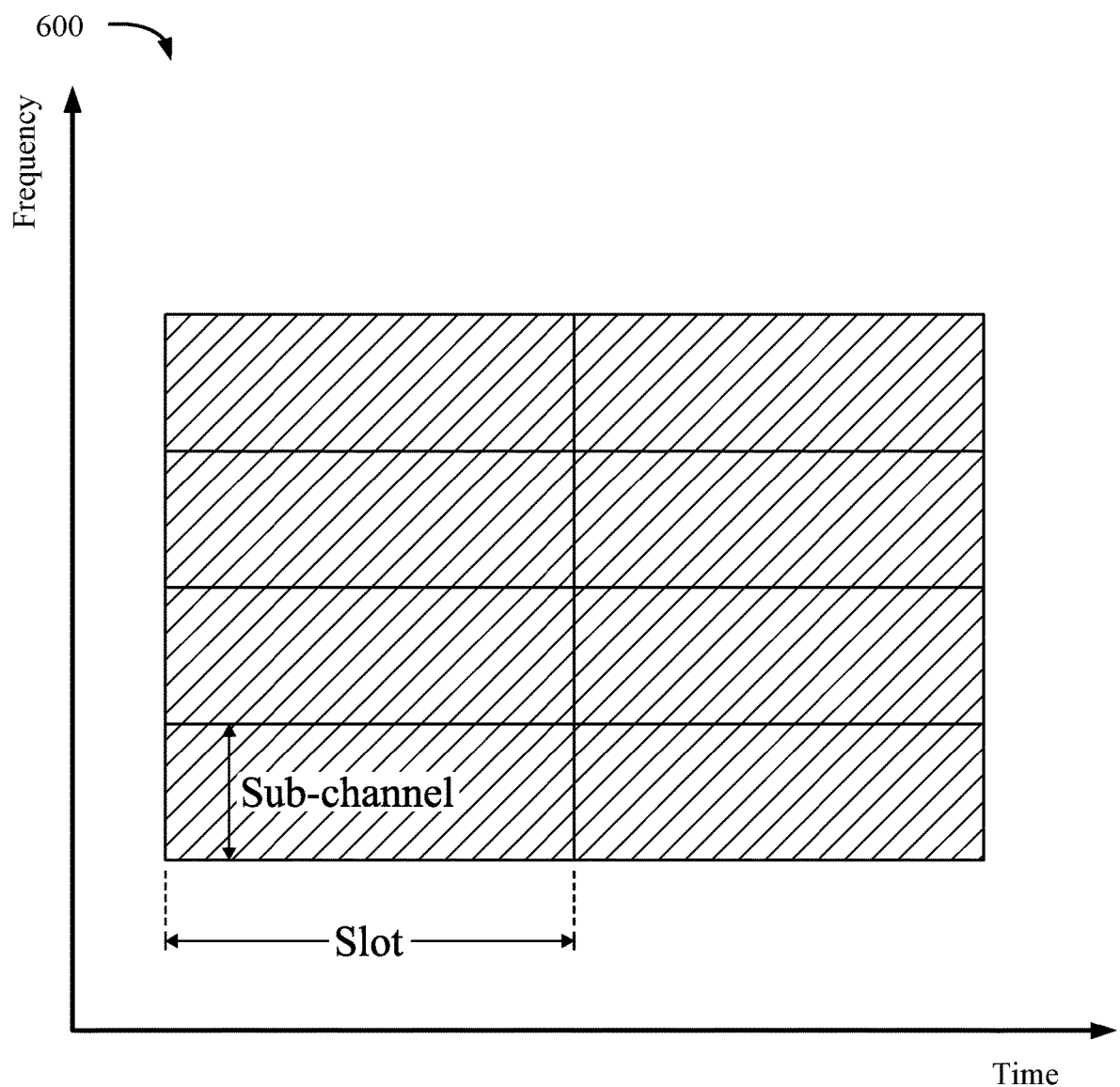
FIG. 6 shows a time-frequency grid illustrating an example legacy resource pool for SL communication, in accordance with certain aspects of the present disclosure.

FIG. 6 shows a time-frequency grid illustrating an example legacy resource pool for sidelink (SL) communication, in accordance with certain aspects of the present disclosure. As illustrated in FIG. 6, the SL resource pool 600 may be partitioned into a variable number of subchannels and slots. The subchannels may include a consecutive set of resource blocks (RBs) spanning different frequencies. In vehicle to everything (V2X) communications, the subchannel size may be large, for example, the minimum number of RBs in a subchannel may include ten RBs. Additionally, similar to the frame format 300 shown in FIG. 3, each slot may include a variable number of symbol periods or minislots that have a transmit time interval with a duration less than a slot.

3$^{rd}$ Generation Partnership Project (3GPP) Release 16 focuses on the continuation of Long Term Evolution's (LTE's) cellular V2X (C-V2X). C-V2X is a unified connectivity platform designed to offer vehicles low-latency V2V, V2I, and V2P communication. In C-V2X communications, a UE may be intended to decode all transmissions. Accordingly, to receive SL packet(s), a receiver (RX) UE may perform blind decoding in all SL subchannels. In some aspects, the number of SL subchannels may be small. For example, the number of SL subchannels may range from 1 subchannel to 27 subchannels; therefore, requiring a UE to blind decode all the SL subchannels may continue to be feasible.

In some cases, within each subchannel, a SL control channel, such as a PSCCH, may occupy a first number of RBs and a first number of symbols of the first subchannel assigned to a SL shared data channel, such as a physical sidelink shared channel (PSSCH). In some cases, control information included in the PSCCH may allocate, starting from a current subchannel in which the PSCCH is transmitted, how many subchannels may be included within the PSSCH. While PSCCH may only occupy up to one subchannel with the lowest subchannel index, PSSCH may occupy up to $N_{subchannel}^{SL}$ contiguous subchannels.

PSCCH may be defined to carry a scheduling assignment (SA), which may be required by a UE to properly detect and decode the corresponding PSSCH. For example, sidelink control information (SCI) may be transmitted over the PSCCH, which carries the information related to the transmission of data over the PSSCH.

In 3GPP Release 16, for V2X, two stage SCI may be considered. For example, first stage SCI may be transmitted in the PSCCH and may contain information about PSSCH bandwidth and resource reservations in future slots. Second stage SCI may be decoded after decoding the PSCCH. A destination identification (ID) may be used to distinguish whether the received packet is intended for the RX UE. A source ID may be used to determine which UE transmitted the packet.

SCI format types may be decoded by intended RX UEs, as well as other SL UEs (particularly in SL resource allocation Mode 2). A RX UE may decode the SCI to determine the size of the bit fields in the SCI.

Decoding the format type for SCI 1 may allow the UE to sense the channel and avoid resource collisions. In some examples, SCI 1 in the PSCCH may be SCI Format 1-A. For SCI Format 1-A, bits may be explicitly given for priority, a frequency resource assignment, a time resource assignment, a resource reservation period, the demodulation reference signal (DMRS) patterns, a stage 2 SCI format, a beta offset for stage 2 SCI rate matching, a number of data layers for the DMRS port, a MCS, an additional MCS table, a PSFCH overhead indicator, and a number of reserved bits for the upper layer. For priority, three bits may be given. For the frequency resource assignment, the number of bits given may depend on the number of slot reservations and the number of subchannels. For the time resource assignment, five or nine bits may be given for two or three reservations. For the resource reservation period, the number of bits given may depend on the number of allowed periods. For the DMRS patterns, the number of bits given may depend on the number of configured patterns. For the stage 2 SCI format, two bits may be given. For the beta offset for stage 2 SCI rate matching, two bits may be given. For the DMRS port, one bit may be given to indicate one or two data layers. For the MCS, five bits may be given. For an additional MCS table, zero to two bits may be given. For the PSFCH overhead indicator, zero or one bits may be given.

Decoding the format type for SCI 2 may allow the UE to decode the PSSCH. In some examples, SCI 2 in the PSCCH may be front-loaded. For front-loaded SCI 2, bits may be explicitly given for a hybrid automatic repeat request (HARQ) ID, a new data indicator (NDI), a redundancy version ID (RV-ID), a source ID, a destination ID, and HARQ enable/disable. For HARQ ID, the number of bits given may depend on a number of the HARQ process. For the NDI, one bit may be given. For the RV-ID, two bits may be given. For the source ID, eight bits may be given. For the destination ID, sixteen bits may be given. For HARQ enable/disable, one bit may be given.

In some examples, SCI 2 may be SCI Format 2-A. For SCI Format 2-A, in addition to the bits described above for SCI 2, bits may also be explicitly given for cast type and CSI request. Cast type and CSI request are fields that are unique to SCI Format 2-A. For cast type, two bits, broadcast, groupcast, and unicast may be given. For CSI request, one bit may be given.

In some examples, SCI 2 may be SCI Format 2-B (negative acknowledgement only (NACK-only) groupcast). For SCI Format 2-B, in addition to the bits described above for SCI 2, bits may also be explicitly given for zone ID and communication range. Zone ID and communication range are fields that are unique to SCI Format 2-B. For zone ID, twelve bits may be given. For communication range, four bits may be given.

Figure 7:
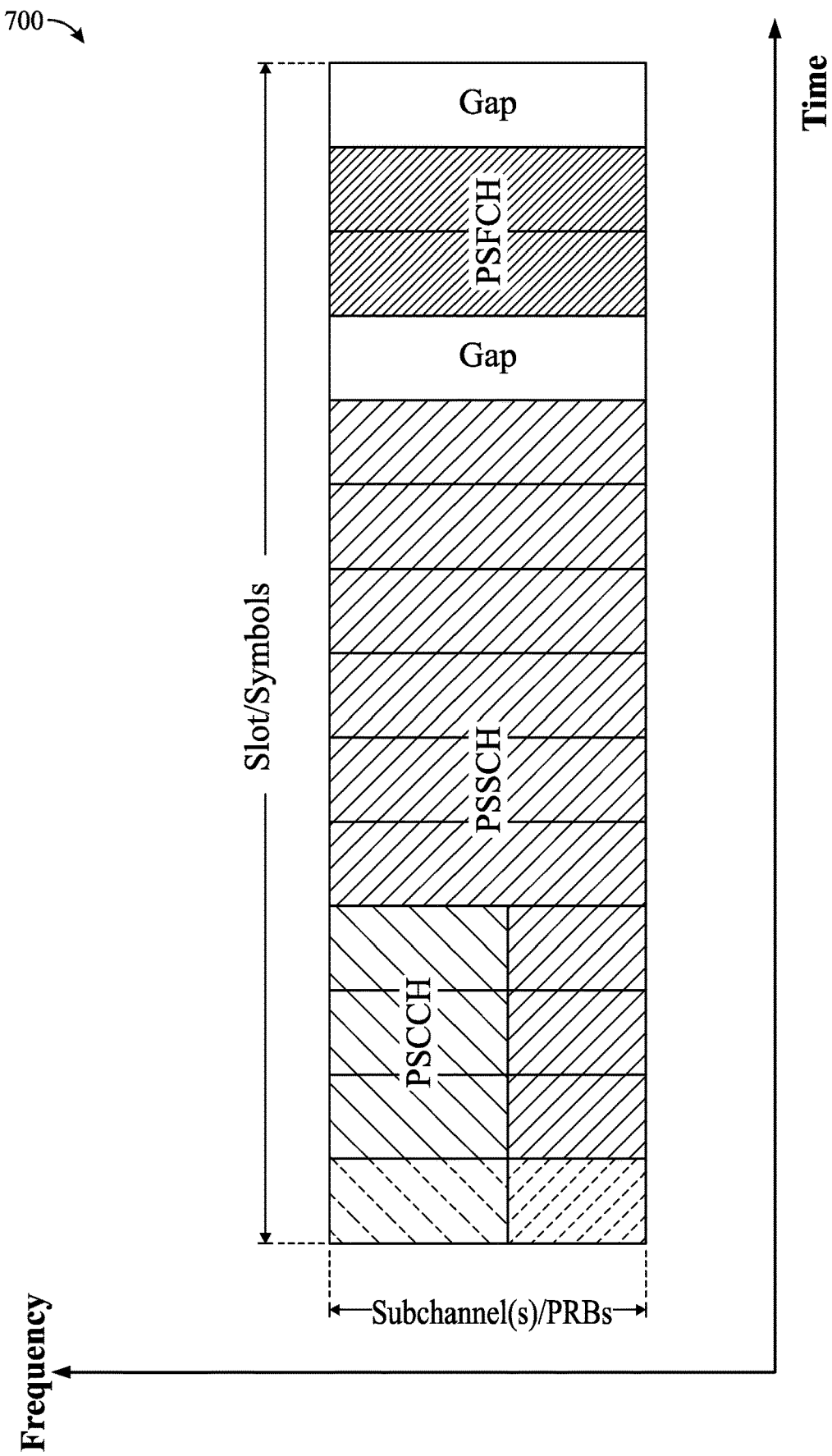
FIG. 7 shows an expanded view of a time-frequency grid illustrating example transmissions in a resource pool for SL communications, in accordance with certain aspects of the present disclosure.

FIG. 7 shows an expanded view of a time-frequency grid illustrating example transmissions in a resource pool for SL communications, in accordance with certain aspects of the present disclosure. As mentioned above, the number of SL subchannels may range from 1-27 subchannels in a resource pool, and each subchannel may occupy {10, 15, 20, 25, 50, 75, 100} physical RBs (PRBs). As shown in FIG. 7, PSCCH, PSSCH, and/or PSFCH transmissions may occupy these subchannels (e.g., PRBs at a granular level).

In some aspects, the size of the PSCCH may be fixed for the resource pool, and the PSCCH may be limited to a single sub-channel. For example, depending on the configuration, the size of the PSCCH may be limited to a range of 10% to 100% of one subchannel (with the first two or three symbols).

In the frequency domain, PSCCH may be configured (or preconfigured) to occupy {10, 12, 15, 20, 25} PRBs, limited to a single subchannel. In the time domain, the PSCCH duration may be configured (or preconfigured) to occupy two or three symbols.

As mentioned above, while PSCCH may only occupy up to one subchannel with the lowest subchannel index, PSSCH may occupy at least 1 subchannel (up to $N_{subchannel}^{SL}$ contiguous subchannels) and contain second stage SCI.

Additionally for C-V2X, resource allocation may be in the frequency domain or the time domain. Frequency domain resource allocation (FDRA) or time domain resource allocation (TDRA) may be indicated in SCI 0_1 of the PSCCH.

The number of reservations signaled by an SCI for FDRA may be a function of the number of SL subchannels PSSCH may occupy, $N_{subchannel}^{SL}$. For example, SCI with $$\left[\log\frac{N_{subchannel}^{SL}(N_{subchannel}^{SL}+1)}{2}\right]$$

bits may signal two reservations for FDRA while SCI with $$\left[\log\frac{N_{subchannel}^{SL}(N_{subchannel}^{SL}+1)(2N_{subchannel}^{SL}+1)}{6}\right]$$

bits may signal three reservations for FDRA.

The number of reservations signaled by an SCI for TDRA may be mapped to a number of bits. For example, SCI with 5 bits may signal two reservations for TDRA while SCI with 9 bits may schedule three reservations for TDRA.

Figures 8A, 8B:
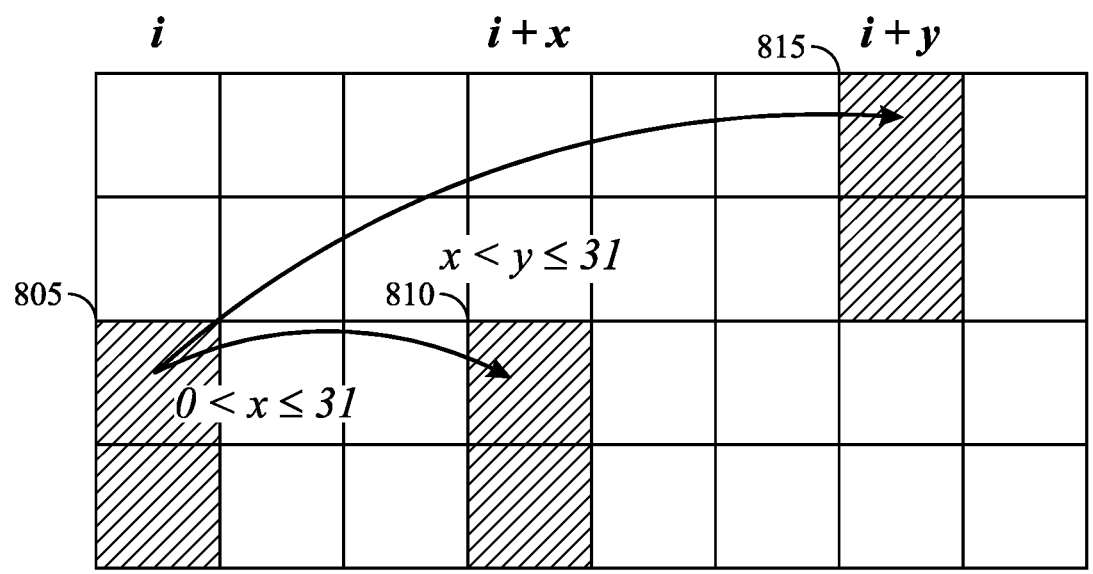
FIG. 8A is a table illustrating exemplary SL resource reservations signaled by an SCI, in accordance with certain aspects of the present disclosure.
FIG. 8B is an exemplary transmission timeline illustrating transmissions corresponding to the resource reservations signaled by a cellular vehicle-to-everything (C-V2X) device in table 800A, in accordance with certain aspects of the present disclosure.

FIG. 8A is a table 800A illustrating exemplary SL resource reservations signaled by an SCI, in accordance with certain aspects of the present disclosure. As shown in table 800A, an SCI may signal three reservations (e.g., Reservation 1, 2, and 3). Each reservation may reserve transmission resources in a single slot with a variable number of subchannels. In the example, transmission in slot i for Reservation 1 may reserve transmission resources in subsequent slots for Reservation 2 and 3, wherein Reservation 2, in the time domain, occurs after Reservation 1 but before Reservation 3 (e.g., slot i+x where 0<x≤31) and Reservation 3, in the time domain, occurs after both Reservation 1 and Reservation 2 (e.g., slot i+y where x<y≤31).

FIG. 8B is an exemplary transmission timeline 800B illustrating transmissions corresponding to the resource reservations signaled by the CV2X device in table 800A, in accordance with certain aspects of the present disclosure. In the exemplary transmission timeline, a UE (e.g., UE 120a, shown in FIG. 1) that is a CV2X device may transmit a SL transmission 815 during a slot i on the subchannels z. The transmission may include data and control information that may be sent in a PSCCH, for example. The control information that the UE includes in transmission i may reserve transmission resources on subchannels z during slot i+x where 0<x≤31, as shown at 810. The control information in transmission i may also reserve transmission resources on subchannels z during slot slot i+y where x<y≤31, as shown at 815. The transmission resources may be reserved for retransmissions of the data in the SL transmission i, for example.

The Internet of Things (IoT) may refer to the networking of devices. These devices may communicate independently via the Internet or a cellular network and perform various tasks. They may be everyday machines such as vehicles, household appliances, consumer electronics and similar devices that collect information about their use, their environment, and that of their users. In the IoT, such devices may have a clear identity and may communicate with one another and receive commands. In contrast to the conventional IoT, the Industrial IoT (IIoT) may represent the industrial form of the IoT and focus on the application of the IoT in a manufacturing and industrial environment, rather than application to consumer-oriented concepts.

In IIoT, SL may enable direct communications between programmable logical controllers (PLCs) and sensors/actuators (S/As). Wireless PLCs may be desired for their flexible and simple deployment. Unlike communications through a BS which may require multiple over-the-airs (OTAs) thereby negatively affecting latency and reliability, PLCs may have the capability to control 20-50 SAs while also ensuring tight latency at 1~2 ms and an ultra-reliability required $10^{-6}$ error rate.

Figure 9:
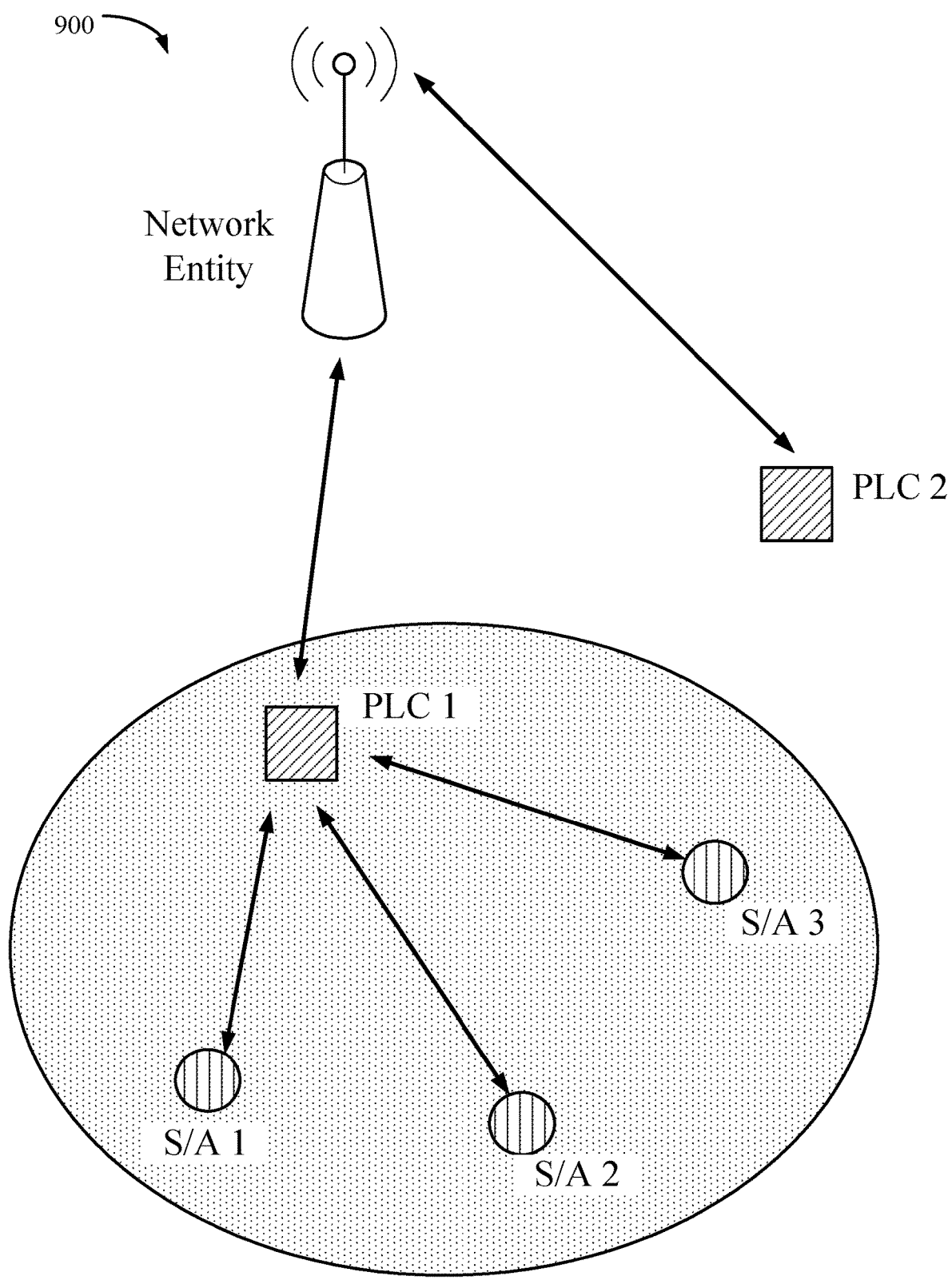
FIG. 9 illustrates an example Industrial Internet of Things (IIoT) deployment including programmable logical controllers (PLCs) and sensors/actuators (S/As) in direct communication, in accordance with certain aspects of the present disclosure.

FIG. 9 illustrates an example IIoT deployment 900 including PLCs and S/As in direct communication, in accordance with certain aspects of the present disclosure. As shown in the non-limiting example of FIG. 9, a network entity (e.g., BS or gNB) may directly communicate with PLC 1 and PLC 2. PLC 1 may further directly communicate with S/A 1, S/A 2, and S/A 3. PLC and S/A communication may ensure latency and reliability requirements are met.

For SL communication, control messages may be transmitted and received in the IIoT deployment 900. For example, sidelink uplink control information (S-UCI) may be a control message transmitted by a S/A (Client) (such as S/A 1, S/A 2, or S/A 3 in FIG. 9) and received by a PLC (Anchor) (such as PLC 1 in FIG. 9) while sidelink downlink control information (S-DCI) may be a control message transmitted by a PLC (Anchor) (such as PLC 1 in FIG. 9) and received by a SA (Client) (such as S/A 1, S/A 2, or S/A 3 in FIG. 9).

IIoT deployments may have specific traffic characteristics. In some aspects, IIoT traffic may be deterministic and include small packet sizes (e.g., 35-256 bytes). In some aspects, the required bandwidth may be low, for example, 2 RBs may be sufficient for some cases. In some aspects, the SAs may have a constraint on UE capability in terms of bandwidth and processing power. In some aspects, the overall bandwidth may be large for IIoT with dedicated frequency bands and/or unlicensed bands. In some aspects, SAs may not need to detect and/or monitor all transmissions. In some aspects, a PSCCH may need to meet stringent IIoT requirements. In some aspects, IIoT may be a challenging radio frequency (RF) environment with blockage and interference.

Example Enhanced Sidelink (SL) Control Signaling with Time Division Duplexing (TDD)

As noted above, aspects of the present disclosure propose a TDD configuration as a mechanism to flexibly provide UEs an indication of UEs subject to half-duplex constraints, an indication of resources available for sidelink communications.

Similar to the use of physical downlink control channels (PDCCHs) and downlink control information (DCI) in downlink (DL) communications, in sidelink (SL) communications, physical sidelink control channel (PSCCH) instances may carry sidelink control information (SCI) which contains information used by receiving user equipments (UEs) to decode the associated physical sidelink shared channel (PSSCH) sequence. Because SCI is transmitted with its associated PSSCH, when there is no data available in the PSSCH, transmission of the SCI may have to occupy an entire slot or the transmission may not be possible. While transmission of the control signaling by occupying an entire slot may be a possible avenue, occupation of an entire slot (for SCI with no data/PSSCH) may be slow and inefficient because UEs may often be required to exchange short control messages.

The control messages may include, but are be limited to, inter-UE coordination messages (helpful for resource selection and/or collision detection), channel state information (CSI) reports, hybrid automatic repeat requests (HARQs), scheduling requests (SRs), and sidelink format indicators (SFIs). For example, in SL Mode 2, a UE may have to perform channel sensing to determine what SL resources are reserved by other SL UEs and what resources are available for SL communications. However, with an inter-UE coordination message, such channel sensing may not be necessary to determine reserved and/or available resources for SL communications.

As mentioned previously, in some cases, the application of SL communications may also expand into an Industrial Internet of Things (IIoT) environment. In the industrial deployment, a programmable logical controller (PLC) may control between 20-50 sensors/actuators (S/As), thus, a large number of control messages may need to be exchanged between the PLC and the S/As. For example, multiple sidelink uplink control information (S-UCI) control messages may need to be transmitted by the S/As (Clients) and received by the PLC (Anchor) while multiple sidelink downlink control information (S-DCI) control messages may be need to be transmitted by the PLC (Anchor) and received by the S/As (Clients).

Accordingly, techniques and apparatus that allow for the frequent exchange of control messages with flexible payload sizes for SL communications, and more specifically, for SL communications in an IIoT environment, as proposed herein, may provide much needed flexibility and lead to more efficient use of resources.

Aspects of the present disclosure provide apparatus, methods, processing systems, and computer readable mediums for enhanced SL control signaling with time division duplexing (TDD). In some aspects, a first UE may receive a TDD configuration indicating resources of a resource pool available for SL transmissions between the first UE and at least a second UE. The TDD configuration may define one or more slots or symbols as flexible slots or symbols that may be configured as downlink (DL) or uplink (UL) slots or symbols. The TDD configuration may also identify one or more of slots or symbols as UL slots or symbols and one or more slots or symbols as DL slots or symbols. The first UE may exchange SL communications with the second UE in the one or more slots or symbols based, at least in part, on the TDD configuration.

The resource pool available for SL transmission may include a dedicated resource pool for S-UCI/S-DCI transmissions. More specifically, dedicated resources may be used for signaling control messages, such as, inter-UE coordination messages, HARQs, CSI reports, SRs, SFIs, and the like.

In some aspects, the dedicated resource pool available for SL transmissions may be frequency division multiplexed (FDMed) with a legacy (e.g., classic) SL resource pool. As previously described with reference to FIG. 6, a legacy SL resource pool may be partitioned into a variable number of subchannels and slots.

According to 3$^{rd}$ Generation Partnership Project (3GPP) Technical Specification (TS) 38.214, in the frequency domain, a SL resource pool consists of sl-NumSubchannel contiguous sub-channels. A sub-channel consists of sl-SubchannelSize contiguous physical resource blocks (PRBs), where sl-NumSubchannel and sl-SubchannelSize are higher layer parameters. The SL resource block (RB) pool consists of $N_{PRB}$ PRBs. The sub-channel m for m=0,1, . . . , numSubchannel−1 consists of a set of $n_{subCHsize}$ contiguous RBs with the PRB number $n_{pRB}=n_{subCHRBstart}+m·n_{subCHsize}+j$ for j=0,1, . . . , $n_{subCHsize}-1$, where $n_{subCHRBstart}$ and $n_{subCHsize}$ are given by higher layer parameters sl-StartRB-Subchannel and sl-SubchannelSize, respectively.

A UE is often not expected to use a certain portion (e.g., the last $N_{PRB}$ mod $n_{subCHsize}$ PRBs) in the resource pool. Thus, for example, the remaining PRBs that are less than the configured subchannel size may be used to FDM the dedicated resource pool available for SL transmission with the legacy SL resource pool.

Figure 10:
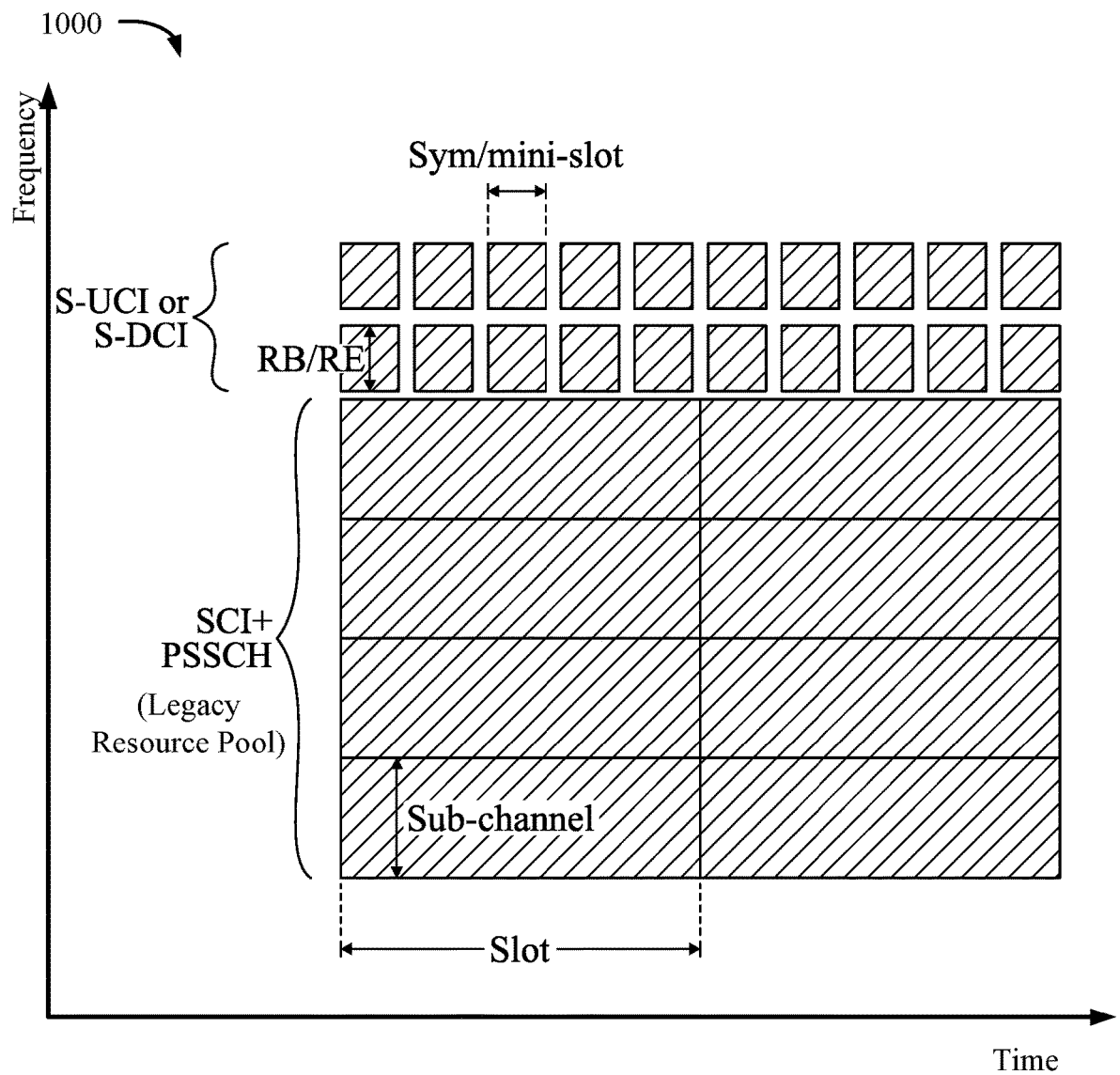
FIG. 10 shows a time-frequency grid illustrating an example dedicated resource pool for SL control signaling frequency division multiplexed (FDMed) with a legacy SL resource pool, in accordance with certain aspects of the present disclosure

FIG. 10 shows a time-frequency grid illustrating an example dedicated resource pool for SL control signaling FDMed with a legacy SL resource pool, in accordance with certain aspects of the present disclosure. As illustrated in FIG. 10, the legacy SL resource pool may be intended for sidelink control information (SCI) transmissions and their associated physical sidelink shared channel (PSSCH) transmissions. The resource allocation granularity for the legacy SL resource pool may be relatively coarse, for example, a subchannel in the frequency domain and a slot in the time domain.

According to certain aspects of the present disclosure, finer resource allocation granularity may be considered for the dedicated S-UCI/S-DCI resource pool compared to that of the legacy resource pool. For example, the resource pool for S-UCI and/or S-DCI transmission may be partitioned into a variable number of mini-slots or symbol periods (e.g., at the symbol-level) in the time domain for time domain resource allocation (TDRA), where the mini-slots and symbol periods have a transmit time interval with a duration less than a slot. Additionally, the resource pool for S-UCI and/or S-DCI transmission may be partitioned into a variable number of RBs or resource elements (REs) (e.g., at the resource element group (REG)/control channel element (CCE) level) for frequency domain resource allocation (FDRA). For example, in some aspects, one RB or one RE and two symbols may be assigned for transmission of S-UCI or S-CDI.

As discussed above, a UE may schedule sidelink transmissions with different SCI formats with different payload sizes, different coverage requirements, and/or different reliability requirements (e.g., SCI repetition/aggregation for coverage enhancement). Thus, because control messages may have different formats—whether it be a long SCI format or a short SCI format for different payload sizes (e.g., for ACK/NAK transmission or CSI-reporting or inter-UE coordination messages)—finer resource allocation granularity defined for the dedicated S-UCI/S-DCI resource pool may allow for the transmission of SL control messages with flexible SCI payload sizes and formats.

The characteristics of packet-based SL communication applications may complicate the allocation of resources in wireless communication networks. Thus, scheduling access and contention-based access may be considered for resource allocation. Scheduling access to the communication link may allow for control of a group of users (e.g., UEs may be scheduled for using the resources) in a manner that avoids conflicting transmissions (i.e., simultaneous transmission on the same physical resource by more than one user).

However, the scheduling request/grant signaling potentially adds significant overhead to the communication link, as well as, add complexity to the managing wireless node (e.g., a network entity (e.g., a gNB) or a PLC). For example, in some aspects, a network entity may schedule resources for the S/As or a PLC may schedule resources for the S/As. In some aspects, a network entity may schedule a set of resources for a PLC, and that PLC may be free to subdivide the resource among all the S/As.

As an alternative, contention-based access may offer potentially greater communication link efficiency by eliminating the signaling overhead of scheduled access. With contention-based access, a grant for access to a channel is broadcast to a cell. Any UE may reserve resources and respond to that grant by opportunistically transmitting on the (contention-based) channel. However, with each user vying for access to the contention-based channel transmitting autonomously, collisions between user transmissions may occur from time to time.

Figure 11:
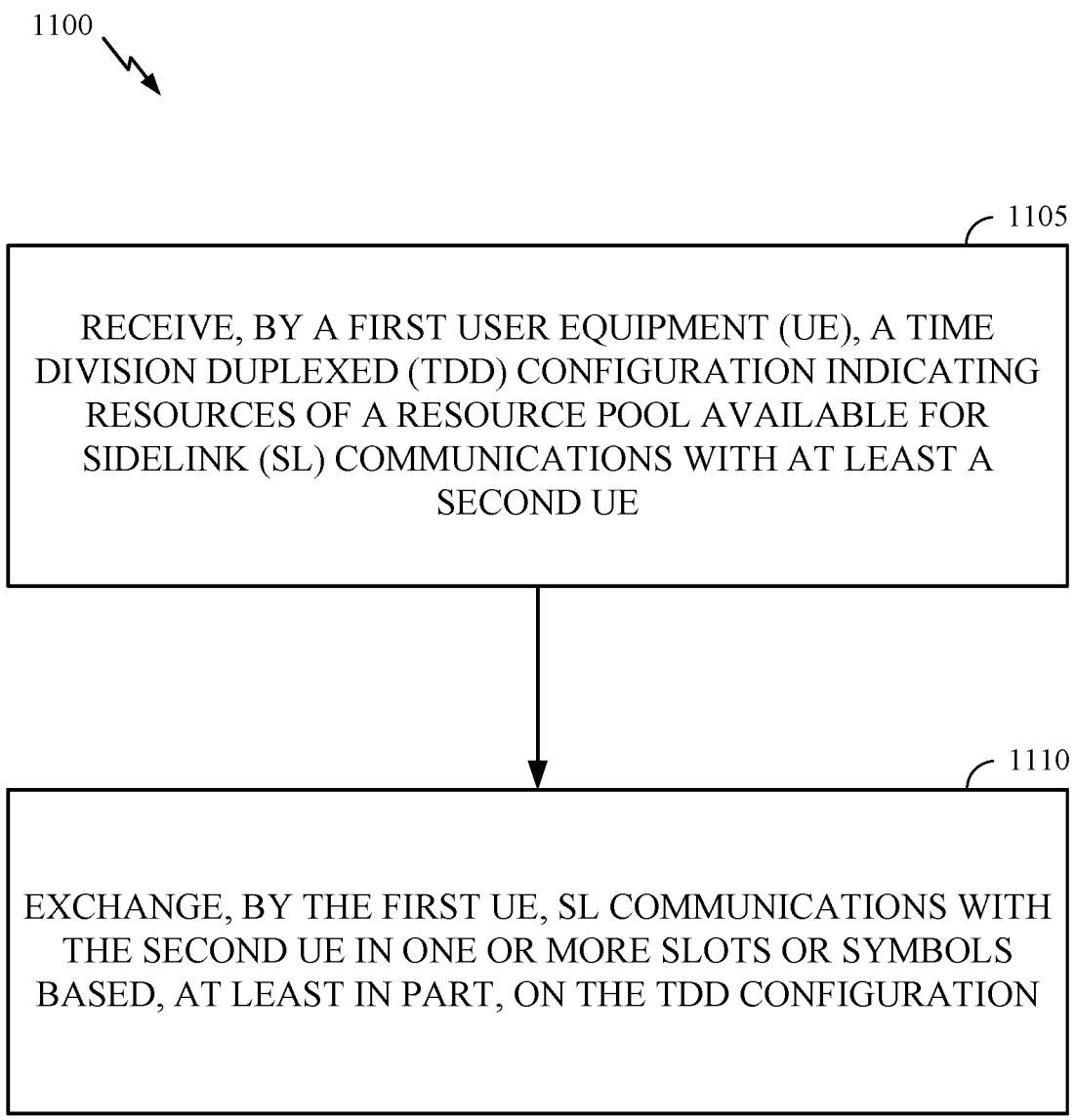
FIG. 11 is a flow diagram illustrating example operations for wireless communication by a first UE, in accordance with certain aspects of the present disclosure.

FIG. 11 is a flow diagram illustrating example operations 1100 for wireless communication, in accordance with certain aspects of the present disclosure. The operations 1100 may be performed, for example, by a first UE (e.g., such as a UE 120a in the wireless communication network 100). Operations 1100 may be implemented as software components that are executed and run on one or more processors (e.g., controller/processor 280 of FIG. 2). Further, the transmission and reception of signals by the first UE in operations 1100 may be enabled, for example, by one or more antennas (e.g., antennas 252 of FIG. 2). In certain aspects, the transmission and/or reception of signals by the first UE may be implemented via a bus interface of one or more processors (e.g., controller/processor 280) obtaining and/or outputting signals.

Operations 1100 begin, at block 1105, by a first UE receiving a TDD configuration indicating resources of a resource pool available for SL transmissions between the first UE and at least a second UE.

At block 1110, the first UE exchanges SL communications with the second UE in one or more slots or symbols based, at least in part, on the TDD configuration.

Optionally, prior to block 1110, when the TDD configuration defines one or more of the slots or symbols as flexible slots or symbols that may be configured as DL or UL slots or symbols, the first UE may monitor for a control message in the one or more slots or symbols. Thus, at 1110, the first UE may exchange SL communications with the second UE in the one or more flexible slots or symbols based, at least in part, on the control message.

Figure 12:
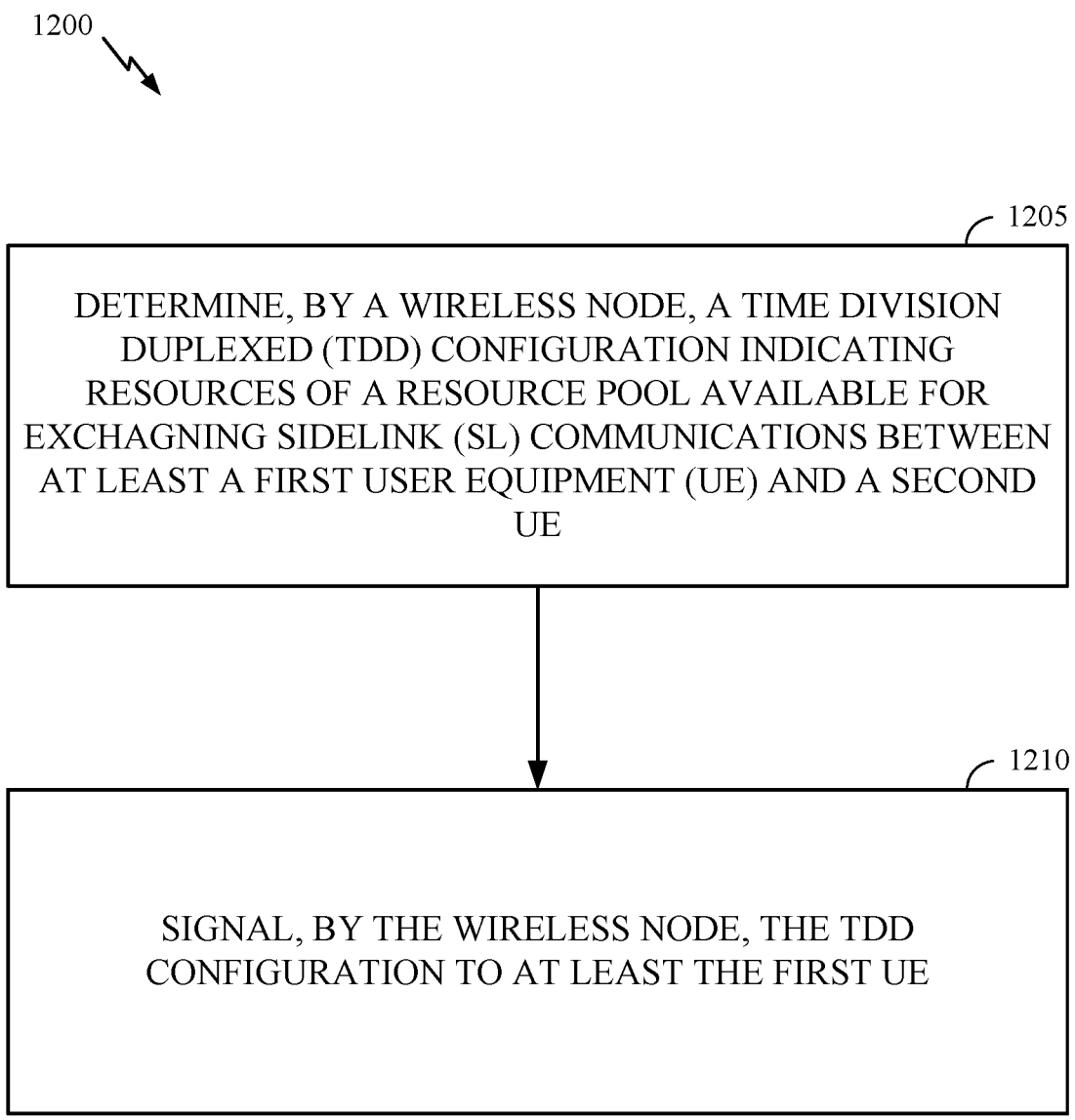
FIG. 12 is a flow diagram illustrating example operations for wireless communication by a wireless node, in accordance with certain aspects of the present disclosure.

FIG. 12 is a flow diagram illustrating example operations 1200 that may be considered complementary to operations 1100 of FIG. 11. For example, operations 1200 may be performed by a wireless node (e.g., such as a network entity (e.g., BS 110a in the wireless communication network 100) or a PLC) to configure a UE (performing operations 1100 of FIG. 11) with resources for sidelink communications. Operations 1200 may be implemented as software components that are executed and run on one or more processors (e.g., controller/processor 240 of FIG. 2). Further, the transmission and reception of signals by the wireless node in operations 1200 may be enabled, for example, by one or more antennas (e.g., antennas 234 of FIG. 2). In certain aspects, the transmission and/or reception of signals by the wireless node may be implemented via a bus interface of one or more processors (e.g., controller/processor 240) obtaining and/or outputting signals.

Operations 1200 begin, at block 1205, by a wireless node determining a TDD configuration indicating resources of a resource pool available for exchanging SL communications between at least a first UE and a second UE At block 1210, the wireless node signals the TDD configuration to at least the first UE.

Optionally, when the TDD configuration defines one or more of the slots or symbols as flexible slots or symbols that may be configured as DL or UL slots or symbols, the wireless node may further transmit a control message dynamically configuring one or more of the flexible slots or symbols for SL communications between the first and second UE.

Figure 13:
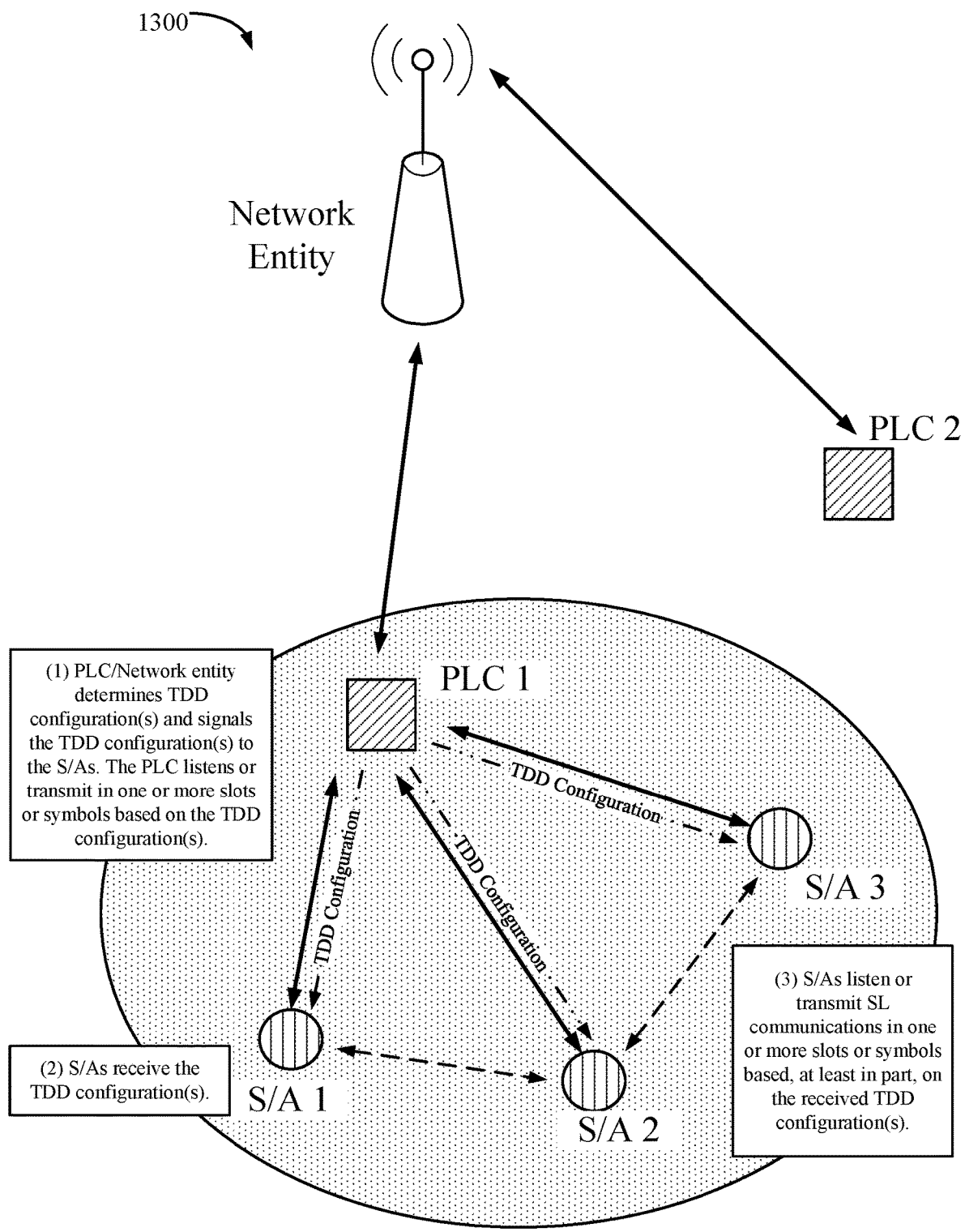
FIG. 13 illustrates example enhanced SL control signaling with time division duplexing (TDD) in an IIoT deployment, in accordance with certain aspects of the present disclosure.

Operations of FIGS. 11 and 12 may be understood with reference to diagram 1300 of FIG. 13 which illustrates example enhanced SL control signaling with TDD in an IIoT deployment, in accordance with certain aspects of the present disclosure.

As shown in the non-limiting example of FIG. 13, and similar to FIG. 9, in an IIoT environment with SL application, a network entity (e.g., BS or gNB) may directly communicate with PLC 1 and PLC 2. PLC 1 may further directly communicate with S/A 1, S/A 2, and S/A 3. According to certain aspects, SL communications may be deployed in a TDD spectrum with a half-duplex (HD) constraint (e.g., assumption that nodes may not transmit and receive simultaneously in the same band); therefore, slots or symbols in the dedicated S-UCI/S-DCI resource pool may need to be defined so that a PLC and a S/A may be able to differentiate between which slots or symbols to use for PLC transmissions (e.g., where a S/A is in listen mode) and which slots or symbols to use for S/A transmissions (e.g., where a PLC is in listen mode).

Similar to the Uu interface, three TDD configurations may be introduced for SL communications. The TDD configurations may determine the PLC/S/A's mode of transmission or reception.

The TDD configuration may define one or more slots or symbols (in the dedicated SL resource pool) as flexible ("F") slots or symbols, downlink ("D") slots or symbols, or uplink ("U") slots or symbols. The D/U/F configuration may be configured via a sidelink format indicator (SFI) and/or a semi-static configuration.

According to certain aspects, at (1) the PLC or network entity may provide the semi-static TDD (between peer UEs) configuration. At (2) the S/As receive the TDD configuration. At (3), the S/As perform sidelink communications in accordance with the TDD configuration.

In some examples, the TDD configuration specifying a D/U/F configuration with a first granularity (e.g., a coarse D/U/F configuration) may be signaled from the network entity to a UE (e.g., S/A), via a system information block (SIB) message (e.g., broadcast in SIB). In some examples, the TDD configuration specifying a D/U/F configuration with a first granularity may be signaled from the PLC to a UE (e.g., S/A), via a physical sidelink broadcast channel (PSBCH) or groupcast with a PSSCH. Further, the (RX) UE may decode the TDD configuration in the PSBCH or PSSCH.

In some aspects, a UE's role as a PLC or S/A may be pre-determined. For example, the UE (e.g., S/A) may determine the TDD configuration will be transmitted to the UE (e.g., S/A) and may further monitor for the TDD configuration based on the determination.

The UE's pre-determined role may determine the UE's mode of transmission or reception with respect to the received TDD configuration. For example, a UE with a pre-determined PLC role may transmit in downlink ("D") slots or symbols and receive in uplink ("U") slots or symbols. On the other hand, a UE with a pre-determined S/A role may receive in downlink ("D") slots or symbols and transmit in uplink ("U") slots or symbols.

According to certain aspects, when a UE (e.g., S/A) is out of coverage (OOC), the UE (e.g., S/A) may be pre-configured with the TDD configuration specifying a D/U/F configuration with a first granularity (e.g., a coarse D/U/F configuration). For example, when a UE is OOC, the UE may try to decode the TDD configuration, signaled from the PLC, in the PSBCH, PSSCH, or SCI. If the TDD configuration cannot be found (e.g., decoded), the UE may transmit and receive in accordance with the pre-configured TDD in the PBSCH, PSSCH, or SCI.

Where the TDD configuration defines the slots or symbols as "D" slots or symbols, a wireless node (e.g., PLC) may be in a transmission mode while a UE (e.g., S/A) may be in a listen mode. Accordingly, the S/A may receive at least one of SCI or SL data in one or more defined "D" slots.

Where the TDD configuration defines the slots or symbols as "U" slots or symbols, a wireless node (e.g., PLC) may be in listen mode while a UE (e.g., S/A) may be in a transmission mode. Accordingly, the S/A may transmit at least one of SCI or SL data in one or more defined "U" slots.

Slots or symbols defined as "F" slots or symbols, may be further configured as "D" or "U" slots or symbols. More specifically, either a wireless node (e.g., PLC) or a UE (e.g., S/A) may transmit or listen, subject to further signaling. By default, for slots or symbols defined as "F" slots or symbols, the UE (e.g., S/A) may monitor for a control message in the one or more flexible slots or symbols and exchange SL communications in the one or more "F" slots or symbols based, at least in part, on the control message. For example, the UE (e.g., S/A) may follow an S-DCI or SCI command from the PLC to transmit or receive in the "F" slot or symbol.

According to certain aspects, the control message may comprise a SFI. The SFI may provide a D/U configuration with a second granularity (e.g., a "finer" availability of "F" slots). Accordingly, the wireless node may provide the SFI configuration for "F" slots. In some examples, the wireless node may be a network entity (e.g., gNB) and the SFI may be sent via a downlink control information (DCI) (e.g., may include SFI in DCI 3_0 for dynamic configuration). In some examples, the wireless node may be a PLC and the SFI may be sent via SCI or S-DCI. The SFI may be UE-specific, group specific, or may be broadcasted to all UEs.

Figure 14:
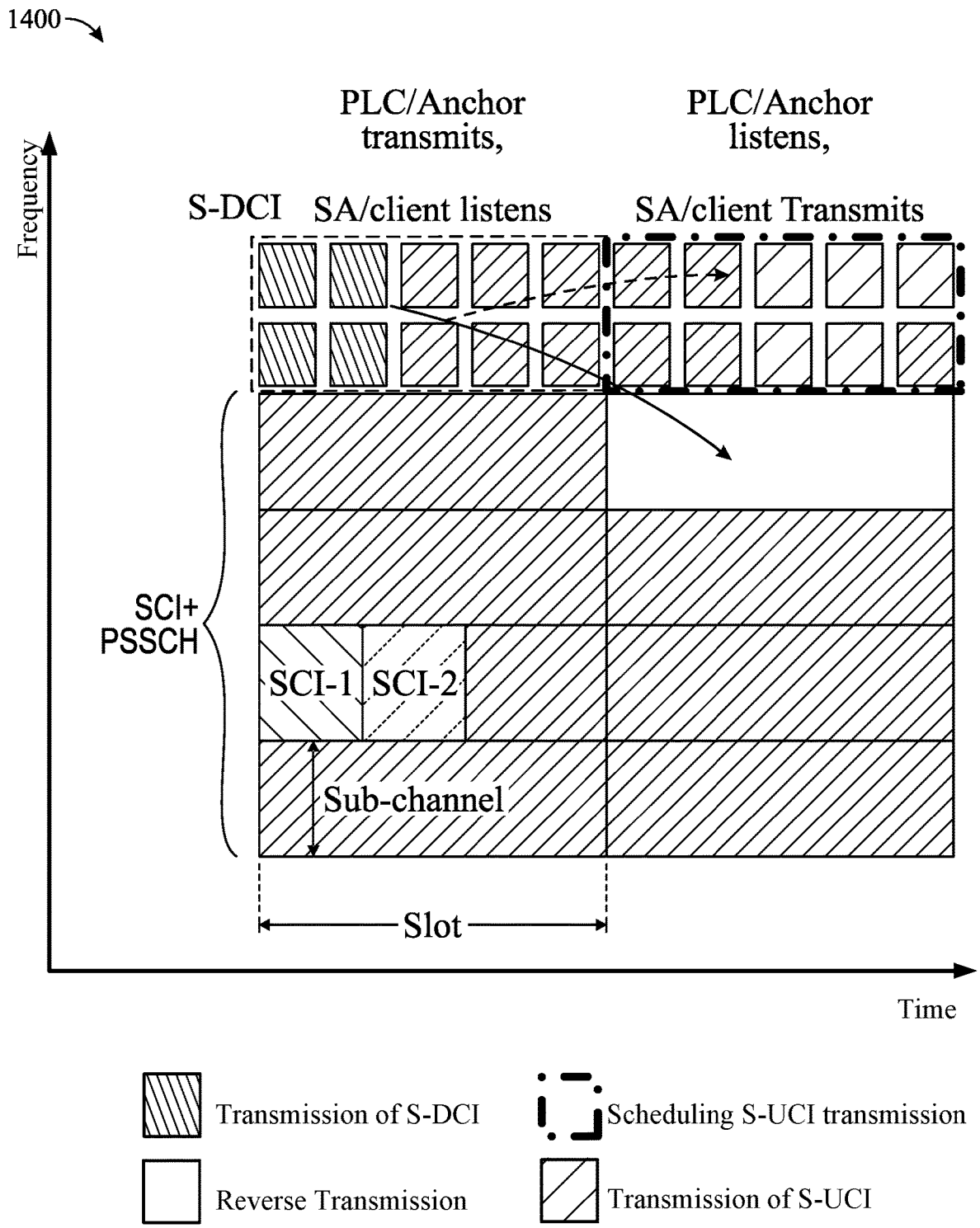
FIG. 14 shows a time-frequency grid illustrating enhanced SL control signaling in an example dedicated resource pool for SL control signaling FDMed with a legacy SL resource pool, in accordance with certain aspects of the present disclosure.

FIG. 14 shows a time-frequency grid 1400 illustrating enhanced SL control signaling in an example dedicated resource pool for SL control signaling FDMed with a legacy SL resource pool, in accordance with certain aspects of the present disclosure. As illustrated in FIG. 14, similar to FIG. 10, the legacy SL resource pool may be intended for SCI transmissions and their associated PSSCH transmissions while the dedicated resource pool may be intended for S-DCI and S-UCI transmissions.

In the non-limiting example of FIG. 14, a PLC may transmit S-DCI in two RBs/REs and two symbols (e.g., shown as four blocks in the diagram 1400). This may enable scheduling of a reverse transmission (e.g., reverse link resource grant). More specifically, the PLC may inform S/A 1 that S/A 1 may use this resource for transmission. Accordingly, S/A 1 may schedule an S-UCI transmission and transmit the S-UCI in the dedicated resource pool (e.g., shown as 5 blocks in the diagram 1400).

According to certain aspects, a wireless node may coordinate with one or more other wireless nodes to avoid cross-link interference. More specifically, there may be inter-PLC coordination among neighbors to avoid cross-link interference via a gNB or S-DCI.

According to certain aspects, a wireless node (e.g., network entity or PLC) may refrain from scheduling S-UCI transmissions when the wireless node (e.g., network entity or PLC) is in a transmission mode. S-UCI resource and a reverse link resource grant may all be based on the TDD configuration defining one or more slots or symbols as "U" or "F" slots or symbols. Accordingly, a UE (e.g., S/A) may interpret S-UCI and/or UL scheduling information based, at least in part, on the TDD configuration specifying a D/U/F configuration with a first granularity (e.g., a coarse D/U/F configuration).

Figure 15:
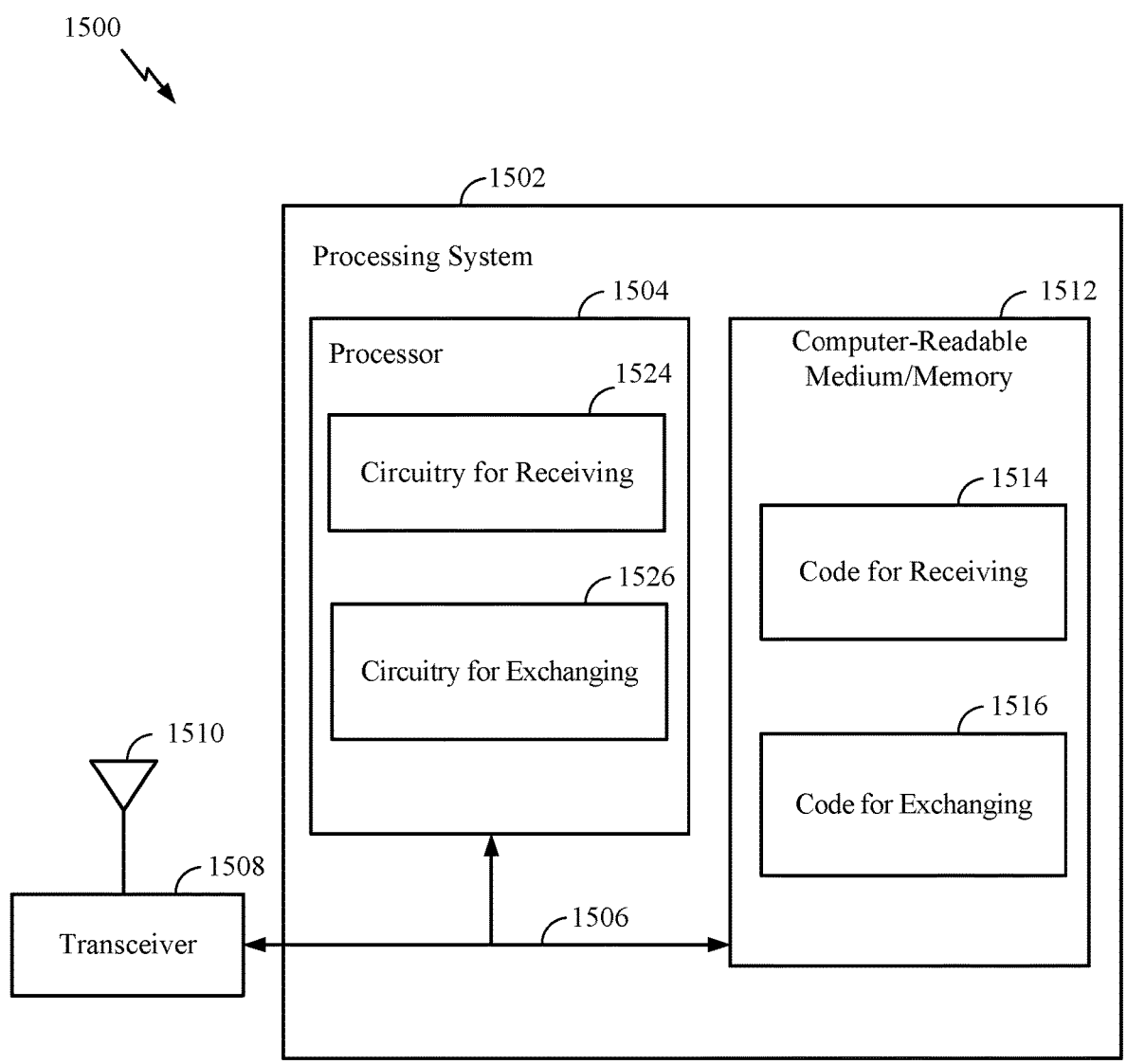
FIG. 15 illustrates an example communications device that may include various components configured to perform operations for the techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 11. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1704 to perform the operations illustrated in FIG. 11, or other operations for performing the various techniques discussed herein for enhanced SL control signaling with TDD. In certain aspects, computer-readable medium/memory 1512 stores code 1514 for receiving (e.g., receiving a TDD configuration indicating resources of a resource pool available for SL transmissions between the first UE and at least a second UE) and code 1516 for exchanging (e.g., for exchanging SL communications with the second UE in one or more slots or symbols based, at least in part, on the TDD configuration). In certain aspects, the processor 1504 has circuitry configured to implement the code stored in the computer-readable medium/memory 1512. The processor 1504 includes circuitry 1524 for receiving (e.g., for receiving a TDD configuration indicating resources of a resource pool available for SL transmissions between the first UE and at least a second UE) and circuitry 1526 for exchanging (e.g., for exchanging SL communications with the second UE in one or more slots or symbols based, at least in part, on the TDD configuration).

Figure 16:
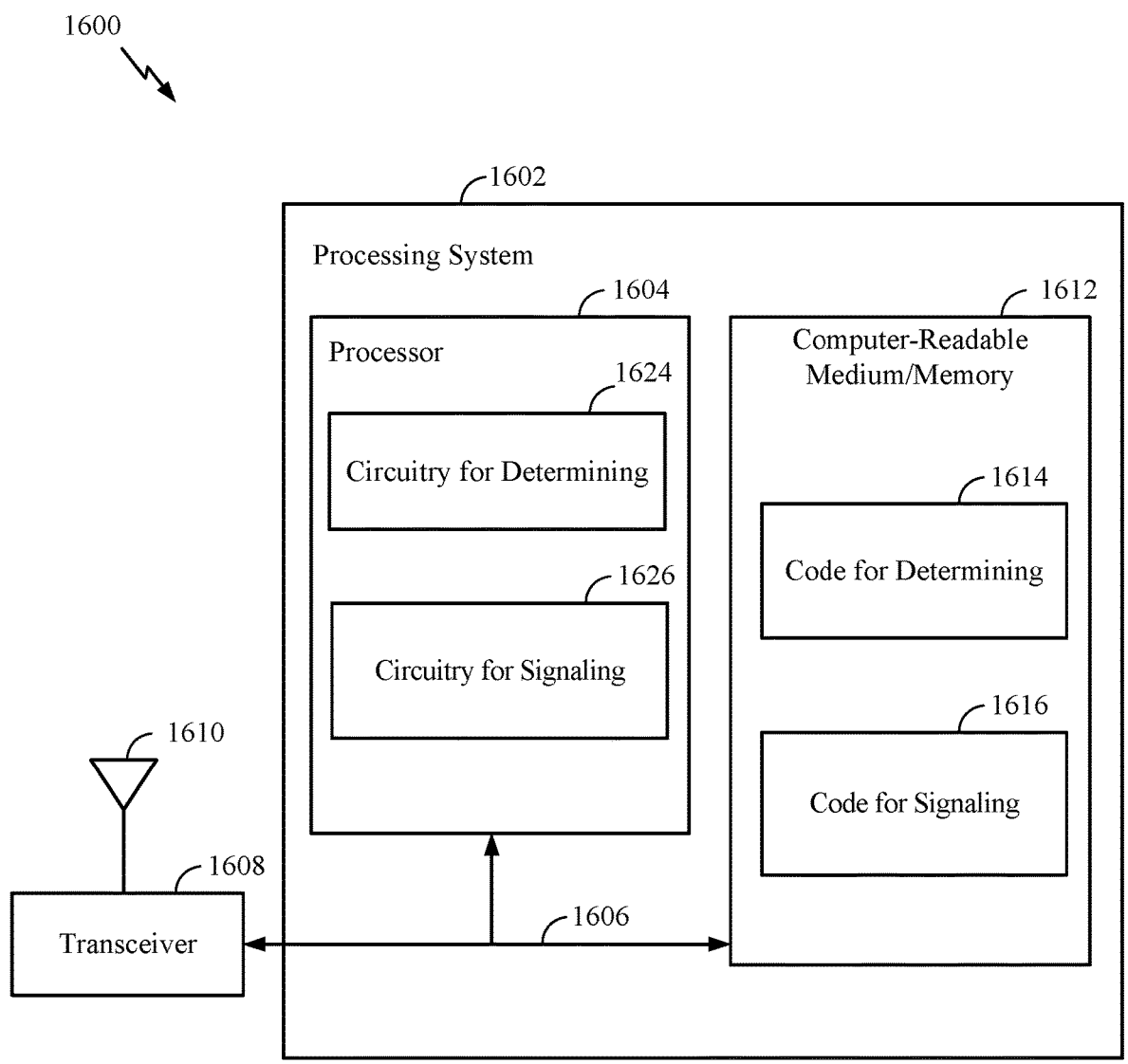
FIG. 16 illustrates an example communications device that may include various components configured to perform operations for the techniques disclosed herein, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 12. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 12, or other operations for performing the various techniques discussed herein for enhanced SL control signaling with TDD. In certain aspects, computer-readable medium/memory 1612 stores code 1614 for determining (e.g., for determining a TDD configuration indicating resources of a resource pool available for exchanging SL communications between at least a first UE and a second UE) and code 1616 for signaling (e.g., for signaling the TDD configuration to at least the first UE). In certain aspects, the processor 1604 has circuitry configured to implement the code stored in the computer-readable medium/memory 1612. The processor 1604 includes circuitry 1624 for determining (e.g., for determining a TDD configuration indicating resources of a resource pool available for exchanging SL communications between at least a first UE and a second UE) and circuitry 1626 for signaling (e.g., for signaling the TDD configuration to at least the first UE).

EXAMPLE ASPECTS

Aspect 1: An apparatus for wireless communication by a first user equipment (UE), comprising: a memory and at least one processor coupled to the memory, the memory and the at least one processor being configured to: receive a time division duplexed (TDD) configuration indicating resources of a resource pool available for sidelink (SL) transmissions between the first UE and at least a second UE; and exchange SL communications with the second UE in one or more slots or symbols based, at least in part, on the TDD configuration.

Aspect 2: The apparatus of Aspect 1, wherein the TDD configuration is received from a network entity via a system information block (SIB) message.

Aspect 3: The apparatus of Aspect 1 or 2, wherein the TDD configuration is received from a programmable logical controller (PLC) via a physical broadcast channel (PBCH) or physical groupcast channel.

Aspect 4: The apparatus of any of Aspects 1-3, wherein the memory and the at least one processor are further configured to: determine the TDD configuration will be transmitted to the first UE; and monitor for the TDD configuration based on the determination.

Aspect 5: The apparatus of any of Aspects 1-4, wherein the first UE is pre-configured with a TDD configuration for use when the first UE is out of coverage (OOC).

Aspect 6: The apparatus of any of Aspects 1-5, wherein the TDD configuration defines one or more of the slots or symbols as flexible slots or symbols that may be configured as downlink (DL) or uplink (UL) slots or symbols.

Aspect 7: The apparatus of Aspect 6, wherein: the TDD configuration also identifies one or more of the slots or symbols as UL slots or symbols and one or more slots or symbols as SL slots or symbols; and exchanging SL communications with the second UE comprises at least one of receiving at least one of sidelink control information (SCI) or SL data from the second UE in one or more defined DL slots or symbols or transmitting at least one of SCI or SL data to the second UE in one or more defined UL slots or symbols.

Aspect 8: The apparatus of Aspect 6 or 7, wherein the memory and the at least one processor are further configured to: monitor for a control message in the one or more flexible slots or symbols; and exchange SL communications with the second UE in the one or more flexible slots or symbols based, at least in part, on the control message.

Aspect 9: The apparatus of Aspect 8, wherein the control message is received from a network entity via a downlink control information (DCI).

Aspect 10: The apparatus of claim 8, wherein the control message is received from a programmable logical controller (PLC) via sidelink control information (SCI).

Aspect 11: The apparatus of claim 8, wherein the control message is received from a programmable logical controller (PLC) via sidelink-downlink control information (S-DCI).

Aspect 12: The apparatus of any of Aspects 8-11, wherein the control message comprises a sidelink format indicator (SFI).

Aspect 13: The apparatus of any of Aspects 1-12, wherein the memory and the at least one processor are further configured to interpret at least one of sidelink uplink control information (S-UCI) or uplink (UL) scheduling information based, at least in part, on the TDD configuration.

Aspect 14: An apparatus for wireless communication by a wireless node, comprising: a memory and at least one processor coupled to the memory, the memory and the at least one processor being configured to: determine a time division duplexed (TDD) configuration indicating resources of a resource pool available for exchanging sidelink (SL) communications between at least a first user equipment (UE) and a second UE; and signal the TDD configuration to at least the first UE.

Aspect 15: The apparatus of Aspect 14, wherein: the wireless node comprises a network entity; and the TDD configuration is signaled from the network entity via a system information block (SIB) message.

Aspect 16: The apparatus of Aspect 14 or 15, wherein: the wireless node comprises a programmable logical controller (PLC); and the TDD configuration is signaled from the PLC via a physical broadcast channel (PBCH) or physical groupcast channel.

Aspect 17: The apparatus of any of Aspects 14-16, wherein the TDD configuration defines one or more slots or symbols as flexible slots or symbols that may be configured as downlink (DL) or uplink (UL) slots or symbols.

Aspect 18: The apparatus of Aspect 17, wherein: the TDD configuration also identifies one or more slots or symbols as UL slots or symbols for the first UE to transmit at least one of sidelink control information (SCI) or SL data to the second UE and one or more DL slots or symbols for the first UE to receive at least one of SCI or SL data from the second UE.

Aspect 19: The apparatus of Aspect 17 or 18, wherein the memory and the at least one processor are further configured to: transmit a control message dynamically configuring one or more of the flexible slots or symbols for SL communications between the first and second UE.

Aspect 20: The apparatus of Aspect 19, wherein the control message is sent via a downlink control information (DCI).

Aspect 21: The apparatus of Aspect 19 or 20, wherein the control message is sent via sidelink control information (SCI).

Aspect 22: The apparatus of any of Aspects 19-21, wherein the control message is sent via sidelink-downlink control information (S-DCI).

Aspect 23: The apparatus of any of Aspects 19-22, wherein the control message comprises a sidelink format indicator (SFI).

Aspect 24: The apparatus of any of Aspects 14-23, wherein the memory and the at least one processor are further configured to coordinate with one or more other wireless nodes to avoid cross-link interference.

Aspect 25: The apparatus of any of Aspects 14-24, wherein the memory and the at least one processor are further configured to: refrain from scheduling sidelink uplink control information (S-UCI) transmissions from the first UE or second UE when the wireless node is in a transmission mode.

Aspect 26: A method for wireless communication by a first user equipment (UE), comprising: receiving a time division duplexed (TDD) configuration indicating resources of a resource pool available for sidelink (SL) transmissions between the first UE and at least a second UE; and exchanging SL communications with the second UE in one or more slots or symbols based, at least in part, on the TDD configuration.

Aspect 27: The method of Aspect 26, wherein the TDD configuration defines one or more of the slots or symbols as flexible slots or symbols that may be configured as downlink (DL) or uplink (UL) slots or symbols.

Aspect 28: The method of Aspect 27, wherein: the TDD configuration also identifies one or more slots or symbols as UL slots or symbols and one or more slots or symbols as SL slots or symbols; and exchanging SL communications with the second UE comprises at least one of receiving at least one of sidelink control information (SCI) or SL data from the second UE in one or more defined DL slots or symbols or transmitting at least one of SCI or SL data to the second UE in one or more defined UL slots or symbols.

Aspect 29: The method of Aspect 27 or 28, further comprising: monitoring for a control message in the one or more flexible slots or symbols; and exchanging SL communications with the second UE in the one or more flexible slots or symbols based, at least in part, on the control message.

Aspect 30: A method for wireless communications by a wireless node, comprising: determining a time division duplexed (TDD) configuration indicating resources of a resource pool available for exchanging sidelink (SL) communications between at least a first user equipment (UE) and a second UE; and signaling the TDD configuration to at least the first UE.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a first user equipment (UE), comprising:
 a memory and at least one processor coupled to the memory, the memory and the at least one processor being configured to:
  determine a subset of frequency resources from a resource pool for sidelink (SL) communications, wherein the subset of frequency resources are dedicated for exchanging one or more control messages with a programmable logic controller (PLC);
  receive a time division duplexed (TDD) configuration for the subset of frequency resources, the TDD configuration indicating a first one or more slots or symbols available for transmitting control messages by the first UE to the PLC in the subset of frequency resources and a second one or more slots or symbols for monitoring control messages from the PLC in the subset of frequency resources; and
  transmit one or more control messages to the PLC in the first one or more slots or symbols in the subset of frequency resources and monitoring one or more control messages from the PLC in the second one or more slots or symbols in the subset of frequency resources based, at least in part, on the TDD configuration.

2. The apparatus of claim 1, wherein the TDD configuration is received from a network entity via a system information block (SIB) message.

3. The apparatus of claim 1, wherein the TDD configuration is received from the PLC via a physical broadcast channel (PBCH) or physical groupcast channel.

4. The apparatus of claim 1, wherein the memory and the at least one processor are further configured to:
determine the TDD configuration will be transmitted to the first UE; and
monitor for the TDD configuration based on the determination.

5. The apparatus of claim 1, wherein the first UE is pre-configured with a TDD configuration for use when the first UE is out of coverage (OOC).

6. The apparatus of claim 1, wherein the TDD configuration defines one or more of the slots or symbols as flexible slots or symbols that may be configured for transmitting one or more control messages to the PLC or for monitoring one or more control messages from the PLC.

7. The apparatus of claim 6, wherein the memory and the at least one processor are further configured to:
monitor for one or more control messages in the one or more flexible slots or symbols by default; and
at least one of: transmit one or more control messages to the PLC or monitor one or more control messages from the PLC in the one or more flexible slots or symbols based, at least in part, on a control message.

8. The apparatus of claim 7, wherein the control message is received from a network entity via a downlink control information (DCI).

9. The apparatus of claim 7, wherein the control message is received from the PLC via sidelink control information (SCI).

10. The apparatus of claim 7, wherein the control message is received from the PLC via sidelink-downlink control information (S-DCI).

11. The apparatus of claim 7, wherein the control message comprises a sidelink format indicator (SFI).

12. The apparatus of claim 1, wherein the memory and the at least one processor are further configured to interpret at least one of sidelink uplink control information (S-UCI) or uplink (UL) scheduling information based, at least in part, on the TDD configuration.

13. An apparatus for wireless communication by a wireless node, comprising:
a memory and at least one processor coupled to the memory, the memory and the at least one processor being configured to:
determine a subset of frequency resources from a resource pool for sidelink (SL) communications, wherein the subset of frequency resources are dedicated for exchanging one or more control messages with a programmable logic controller (PLC);
determine a time division duplexed (TDD) configuration for the subset of frequency resources, the TDD configuration indicating a first one or more slots or symbols for transmitting one or more control messages by at least a first user equipment (UE) and a programmable logic controller (PLC) in the subset of frequency resources and a second one or more slots or symbols for transmitting one or more control messages by the PLC to the first UE in the subset of frequency resources; and
signal the TDD configuration to at least the first UE.

14. The apparatus of claim 13, wherein:
the wireless node comprises a network entity; and
the TDD configuration is signaled from the network entity via a system information block (SIB) message.

15. The apparatus of claim 13, wherein:
the wireless node comprises a PLC; and
the TDD configuration is signaled from the PLC via a physical broadcast channel (PBCH) or physical groupcast channel.

16. The apparatus of claim 13, wherein the TDD configuration defines one or more of the slots or symbols as flexible slots or symbols that may be configured for transmitting one or more control messages by the first UE to the PLC or for transmitting one or more control messages from the PLC to the first UE.

17. The apparatus of claim 16, wherein the memory and the at least one processor are further configured to:
transmit a control message dynamically configuring one or more of the flexible slots or symbols for SL communications between the first UE and the PLC.

18. The apparatus of claim 17, wherein the control message is sent via a downlink control information (DCI).

19. The apparatus of claim 17, wherein the control message is sent via sidelink control information (SCI).

20. The apparatus of claim 17, wherein the control message is sent via sidelink downlink control information (S-DCI).

21. The apparatus of claim 17, wherein the control message comprises a sidelink format indicator (SFI).

22. The apparatus of claim 13, wherein the memory and the at least one processor are further configured to coordinate with one or more other wireless nodes to avoid cross-link interference.

23. The apparatus of claim 13, wherein the memory and the at least one processor are further configured to refrain from scheduling sidelink uplink control information (S-UCI) transmissions from the first UE when the wireless node is in a transmission mode.

24. A method for wireless communication by a first user equipment (UE), comprising:
determining a subset of frequency resources from a resource pool for sidelink (SL) communications, wherein the subset of frequency resources are dedicated for exchanging one or more control messages with a programmable logic controller (PLC);
receiving a time division duplexed (TDD) configuration for the subset of frequency resources, the TDD configuration indicating a first one or more slots or symbols available for transmitting control messages by the first UE to the PLC in the subset of frequency resources and a second one or more slots or symbols for monitoring control messages from the PLC in the subset of frequency resources; and
transmitting one or more control messages to the PLC in the first one or more slots or symbols in the subset of frequency resources and monitoring one or more control messages from the PLC in the second one or more slots or symbols in the subset of frequency resources based, at least in part, on the TDD configuration.

25. The method of claim 24, wherein the TDD configuration defines one or more of the slots or symbols as flexible slots or symbols that may be configured for transmitting one or more control messages to the PLC or for monitoring one or more control messages from the PLC.

26. The method of claim 25, further comprising:
monitoring for one or more control messages in the one or more flexible slots or symbols by default; and
at least one of: transmitting one or more control messages to the PLC or monitoring one or more control messages from the PLC in the one or more flexible slots or symbols based, at least in part, on a control message.

27. A method for wireless communications by a wireless node, comprising:
determining a subset of frequency resources from a resource pool for sidelink (SL) communications, wherein the subset of frequency resources are dedicated for exchanging one or more control messages with a programmable logic controller (PLC);
determining a time division duplexed (TDD) configuration for the subset of frequency resources, the TDD configuration indicating a first one or more slots or symbols for transmitting one or more control messages by at least a first user equipment (UE) and a programmable logic controller (PLC) in the subset of frequency resources and a second one or more slots or symbols for transmitting one or more control messages by the PLC to the first UE in the subset of frequency resources; and
signaling the TDD configuration to at least the first UE.

* * * * *